(12) United States Patent
Otsuka

(10) Patent No.: US 12,394,016 B2
(45) Date of Patent: Aug. 19, 2025

(54) LOW DELAY SUPER-RESOLUTION PROCESSING

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 375 days.

(21) Appl. No.: 17/907,845

(22) PCT Filed: Mar. 23, 2021

(86) PCT No.: PCT/JP2021/012026
§ 371 (c)(1),
(2) Date: Aug. 29, 2022

(87) PCT Pub. No.: WO2021/193648
PCT Pub. Date: Sep. 30, 2021

(65) Prior Publication Data
US 2023/0128106 A1    Apr. 27, 2023

(30) Foreign Application Priority Data
Mar. 25, 2020   (JP) ................. 2020-054671

(51) Int. Cl.
G06T 3/4053 (2024.01)
H04N 19/172 (2014.01)
A63F 13/00 (2014.01)

(52) U.S. Cl.
CPC ......... *G06T 3/4053* (2013.01); *H04N 19/172* (2014.11)

(58) Field of Classification Search
CPC ........ A63F 13/35; A63F 13/49; G06T 3/4053; G06T 3/4046; H04N 19/17; H04N 19/172; H04N 7/01
(Continued)

(56) References Cited

U.S. PATENT DOCUMENTS 5,742,710 A    4/1998  Hsu
8,531,736 B2    9/2013  Matsunaga
(Continued)

FOREIGN PATENT DOCUMENTS

JP    7262381 A    10/1995
JP    2005020761 A    1/2005
(Continued)

OTHER PUBLICATIONS

International Search Report for corresponding PCT Application No. PCT/JP2021/012026, 6 pages, dated Jun. 22, 2021.
(Continued)

*Primary Examiner* — Chad Dickerson
(74) *Attorney, Agent, or Firm* — Kilpatrick Townsend & Stockton LLP

(57) ABSTRACT

A client terminal includes a data acquiring section, a super-resolution processing section 48, and a display control section. The data acquiring section of the client terminal acquires video data in units of partial image which is smaller than one frame. The super-resolution processing section of the client terminal executes a super-resolution process in units of partial image acquired by the data acquiring section. The display control section of the client terminal sequentially outputs, to a display panel, partial images having undergone the super-resolution process at the super-resolution processing section.

12 Claims, 20 Drawing Sheets

(58) Field of Classification Search
USPC .......................................................... 399/299
See application file for complete search history.

(56) References Cited

U.S. PATENT DOCUMENTS

| | | | |
|---|---|---|---|
| 9,697,583 | B2 | 7/2017 | Motohashi |
| 10,225,624 | B2 | 3/2019 | Long |
| 12,112,451 | B2* | 10/2024 | Otsuka .................... H04N 7/01 |
| 2005/0019000 | A1 | 1/2005 | In-Keon |
| 2007/0115371 | A1 | 5/2007 | Enomoto |
| 2007/0139536 | A1 | 6/2007 | Watanabe |
| 2010/0026885 | A1 | 2/2010 | Terada |
| 2010/0073732 | A1 | 3/2010 | Matsunaga |
| 2010/0119157 | A1* | 5/2010 | Kameyama .......... H04N 19/587 |
| | | | 382/243 |
| 2012/0147205 | A1* | 6/2012 | Lelescu .................... G06T 5/80 |
| | | | 348/E5.024 |
| 2015/0003528 | A1 | 1/2015 | Toichi |
| 2015/0332435 | A1 | 11/2015 | Motohashi |
| 2016/0330531 | A1* | 11/2016 | Long .................... G11B 27/031 |
| 2019/0052883 | A1 | 2/2019 | Ikeda |
| 2021/0066373 | A1 | 3/2021 | Toda |
| 2021/0097646 | A1* | 4/2021 | Choi .................... G06T 3/4053 |

FOREIGN PATENT DOCUMENTS

| | | |
|---|---|---|
| JP | 2007148537 A | 6/2007 |
| JP | 2009117886 A | 5/2009 |
| JP | 2009296208 A | 12/2009 |
| JP | 2010074732 A | 4/2010 |
| JP | 2010278898 A | 12/2010 |
| JP | 2012049747 A | 3/2012 |
| JP | 2013127718 A | 6/2013 |
| JP | 2013128286 A | 6/2013 |
| JP | 2015012548 A | 1/2015 |
| JP | 2015232869 A | 12/2015 |
| JP | 2016054459 A | 4/2016 |
| JP | 2017510114 A | 4/2017 |
| JP | 2019129328 A | 8/2019 |

OTHER PUBLICATIONS

International Search Report for related PCT Application No. PCT/JP2021/012027, 6 pages, dated Jun. 29, 2021.

* cited by examiner

FIG.13
FIG.14
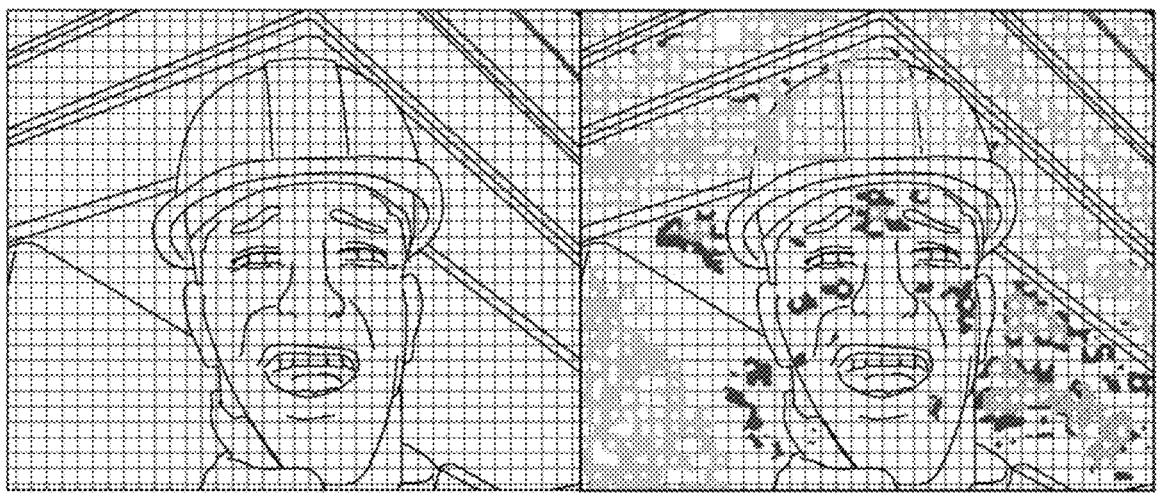
Weak artifact  Strong artifact

LOW DELAY SUPER-RESOLUTION PROCESSING

TECHNICAL FIELD

The present disclosure relates to a data processing technology, and more particularly, relates to an image processing apparatus and a server.

BACKGROUND ART

In cloud gaming, a server executes a game application, so that a game scene image is drawn. The server provides the drawn game scene image to a client terminal over a network. The client terminal displays the game scene image provided from the server.

SUMMARY

Technical Problems

A game scene image provided from a server is transmitted in a finite network band. This may cause reduction in the resolution or deterioration of the video quality due to lossy compression encoding. In addition, the resolution or a usable color space of a display provided to a client terminal may be more advanced than the resolution or the color space of a game scene image provided from the server. In such a case, in order to enhance the quality of the game scene image to be viewed by a user, the client terminal may execute a super-resolution process.

In a conventional manner, a long period of time is taken to execute a super-resolution process, whereby it can be difficult for a user to play cloud gaming in real time.

The present disclosure has been made in view of the above problems, and one object thereof is to provide a technology of executing a super-resolution process with low delay.

Solution to Problems

In order to solve the above-mentioned problems, an image processing apparatus according to a certain aspect of the present disclosure includes an acquisition section that acquires video data in units of partial image which is smaller than one frame, a super-resolution processing section that executes a super-resolution process in units of partial image acquired by the acquisition section, and a display control section that sequentially outputs, to a display section, partial images having undergone the super-resolution process at the super-resolution processing section.

Another aspect of the present disclosure is a server. The server includes an image generating section that generates a video of an application in units of frame, a compression encoding section that compression-encodes an image generated by the image generating section, in units of partial image that is smaller than one frame, and a transmission section that transmits the compression-encoded partial image to a client terminal that executes a super-resolution process in units of partial image.

It is to be noted that a system, a computer program, and a recording medium having a computer program recorded therein that are obtained by translating any combinations of the above constituent elements and expressions in the present disclosure are also effective as aspects of the present disclosure.

Advantageous Effect of Invention

According to the present disclosure, a super-resolution process can be executed with low delay.

BRIEF DESCRIPTION OF DRAWINGS

FIG. 13 is a diagram depicting an example of a scene analysis method.

FIG. 14 is a diagram depicting an example of a scene analysis method.

DESCRIPTION OF EMBODIMENTS

Background and Problems

Figure 1:
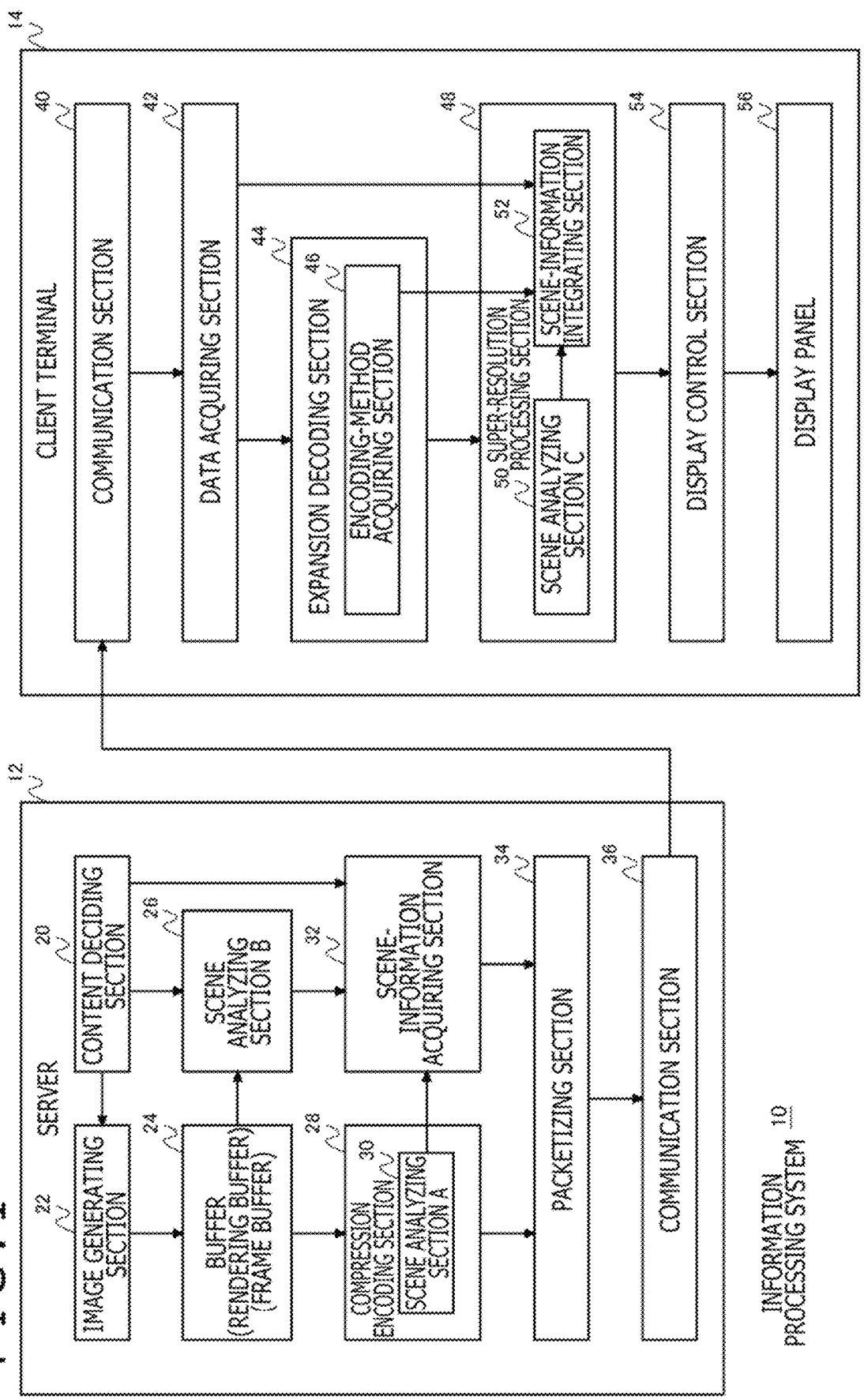
FIG. 1 is a block diagram depicting a configuration of an information processing system according to a first embodiment.

The background and problems of a super-resolution process in cloud gaming will be explained. Super Resolution (or video quality enhancement) is image processing that involves an increase in the definition of an image and decompression or reconstruction of a high-frequency component.

In cloud gaming, a server executes a game application, so that a game scene image is drawn. The game scene image is provided to a client terminal over a network. A user views the game scene through the client terminal, and performs input to the game. Data regarding the user input is transferred to the server over the network, and is reflected in the progress of the game application.

If a series of these processes takes time to execute, arrival of a game scene image at a client terminal is delayed, so that playing a game in real time is difficult for a user. For this reason, reduction of delay in the overall processing system has been demanded.

In addition, the game scene image is a video image of 60 fps (frames per second) of an FHD (Full HD) image (1920×1080 pixels), or 60 fps of a 4K image (3840×2160 pixels), for example. It is necessary to perform compression encoding to transmit such a game scene image in a finite network band (10 Mbps or 30 Mbps, for example).

Here, since a game scene image is transmitted in a finite network band, video quality deterioration or resolution reduction (downscaling) in the game scene image can be caused by lossy compression encoding. In addition, the resolution or a usable color space of a display of the client terminal is more advanced than the resolution or the color space of a game scene image transmitted from the server, in some cases. Therefore, in order to enhance the quality of a game scene image to be viewed by a user, a super-resolution process may be executed at the client terminal to which the game scene image has been provided.

In a super-resolution process, resolution enhancement (upscaling), a filtering process, decompression/reconstruction, or the like is performed on an image on the basis of a result of a scene analysis for determining or inferring contents of the image. As described above, while reduction of delay in the overall processing system has been demanded, but there is necessity to minimize a period of time of additional processes. However, in a conventional super-resolution process manner, delay of one or more frames occurs during these processes. Further, in a scene analysis process prior to the super-resolution process, there is a limit to determination of a scene according to every video condition. Moreover, there is a dilemma that, when the analysis capacity is intended to be increased, it is necessary to perform an advanced process, whereby a process delay becomes large.

In view of the above background and problems, the present disclosure provides a technology of executing a super-resolution process with low delay in cloud gaming and a technology of executing a super-resolution process based on scene information in cloud gaming.

An explanation of a method proposed herein for executing a super-resolution process in cloud gaming will be given.

<First Solution: Method a of Executing a Super-Resolution Process with Low Delay in Cloud Gaming>

(1) A super-resolution processing section performs a process in units of partial image (hereinafter, also referred to as a "slice"), and outputs, to a display control section, the process result with equal or finer granularity.

(2) In a case where a video compression encoding section/expansion decoding section performs a process in units of partial image (slice) and outputs images of the expanded result in units of partial image (slice), the super-resolution processing section which is on a later stage performs a process in the same units of partial image (slice), and outputs, to the display control section, the process result with equal or finer granularity.

(3) The super-resolution processing section performs a process in basic units that coincide with basic units used in a video compression encoding process, or in multiples of the basic units.

(4) The super-resolution processing section performs a process in units of partial image (slice), during a scene analysis that is performed by the super-resolution processing section itself.

(5) The super-resolution processing section performs a process in units of partial image (slice). A memory that holds data in units of partial image is provided between a video expansion decoding section which is on a prior stage and the super-resolution processing section. A memory that holds data in units of partial image is provided between the display control section which is on a later stage and the super-resolution processing section. The super-resolution processing section performs flow control in units of partial image, with respect to the video expansion decoding section and with respect to the display control section.

(6) In a case where the super-resolution processing section performs a scene analysis or a scene information integrating process, enhancement of the image resolution (upscaling), an image filtering process, image decompression/reconstruction, etc., each of these processes is performed in units of partial image. A multiple of a unit granularity of internal processing in the super-resolution processing section is set to be equal to a unit of partial image.

(7) In a case where the super-resolution processing section uses deep learning in the super-resolution process, a plurality of inferring sections are provided to the super-resolution processing section, and the inferring sections can be switched when necessary. Accordingly, in a case where a deep learning model (a database holding learning results) that varies according to a scene analysis result needs to be dynamically applied to the inferring sections, a period of time required to initialize the setting can be concealed.

(8) In the scene analysis, an inputted image is converted to a plurality of types of low-resolution images by pyramid scaling, and a scene analysis is performed on the images in order from the lowest resolution.

(9) In the scene analysis, a scene analysis is performed on small regions sampled, at an original resolution, from discrete positions in an inputted image.

(10) On the basis of a scene type acquired from a game application, either simplification or non-execution of a super-resolution process is selected.

<Second Solution: Method B of Executing Super-Resolution Process with Low Delay in Cloud Gaming>

This solution is also a method in which a super-resolution process in cloud gaming is executed on the basis of scene information.

(1) A super-resolution processing section acquires scene information as a hint from a prior stage, and uses the scene information for a super-resolution process.

(2) Scene information for use in a super-resolution process at a client terminal is previously acquired by a server, and is transmitted to the client terminal.

(3) Scene information for use in a super-resolution process at the client terminal is acquired by the server in parallel with compression encoding, and is transmitted to the client terminal.

(4) Scene information for use in a super-resolution process at the client terminal is acquired by the server in parallel with compression encoding, and is transmitted to the client terminal.

(5) Scene information for use in a super-resolution process at the client terminal is acquired from a game application by the server, and is transmitted to the client terminal.

(6) Scene information for use in a super-resolution process at the client terminal is acquired from a scene analysis result used in compression encoding at the server, and is transmitted to the client terminal.

(7) Scene information for use in a super-resolution process at the client terminal is acquired from a configuration result of a compression encoding process used by the expansion decoding section.

(8) By using the scene information acquired from the server or the expansion decoding section, a super-resolution processing section of the client terminal executes a super-resolution process.

(9) By using the scene information acquired from the server or the expansion decoding section, the super-resolution processing section of the client terminal omits or simplifies a scene analysis to be executed by the super-resolution processing section itself.

First Embodiment

FIG. 1 is a block diagram depicting a configuration of an information processing system 10 according to the embodiment. The information processing system 10 includes a server 12 and a client terminal 14. The server 12 is an information processing apparatus that executes an application (a game application in the embodiment). The client terminal 14 is an image processing apparatus (can be called an information processing apparatus such as a stationary game machine) that displays an image (e.g. a game scene image) of the application executed by the server 12. The server 12 and the client terminal 14 are connected to each other via a communication network such as a LAN (Local Area Network), a WAN (Wide Area Network), or the internet.

The server 12 includes a content deciding section 20, an image generating section 22, a buffer 24 (rendering buffer and frame buffer), a compression encoding section 28, a scene analyzing section B 26, a scene-information acquiring section 32, a packetizing section 34, and a communication section 36. The compression encoding section 28 includes a scene analyzing section A 30. The client terminal 14 includes a communication section 40, a data acquiring section 42, an expansion decoding section 44, a super-resolution processing section 48, a display control section 54, and a display panel 56. The expansion decoding section 44 includes an encoding-method acquiring section 46. The super-resolution processing section 48 includes a scene analyzing section C 50 and a scene-information integrating section 52.

Blocks depicted in the block diagrams in the present disclosure can be implemented by elements or machines including a computer CPU (Central Processing Unit)/memory in terms of hardware, and can be implemented by computer programs or the like in terms of software. However, functional blocks that are implemented by cooperation of hardware and software are depicted in the drawings. A person skilled in the art will understand that these functional blocks can be implemented by a combination of hardware and software in various ways.

Processes at the respective functional blocks in FIG. 1 will be explained. The content deciding section 20 of the server 12 is mainly implemented by a CPU, executes a game application, and decides contents to be drawn. The image generating section 22 of the server 12 is mainly implemented by a GPU (Graphics Processing Unit), and draws (in other words, generates) frames of a video of a game application on the basis of a processing result of the game application (e.g. data regarding contents to be drawn) obtained by the content deciding section 20. The image generating section 22 stores the frames which are drawing results into the buffer 24 (frame buffer). It is to be noted that the buffer 24 (rendering buffer) of the server 12 stores a halfway result of a drawing process performed by the image generating section 22, for example.

The compression encoding section 28 of the server 12 compression-encodes data regarding the images (frames) stored in the buffer 24 (frame buffer) in units of partial image which is smaller than one frame. Alternatively, the compression encoding section 28 may perform lossy compression. A partial image is an image of each of regions obtained by dividing a frame image plane into pieces of a predetermined size. That is, a partial image is an image of each of regions obtained by dividing an image plane according to boundary lines set in a lateral direction, a longitudinal direction, both lateral and longitudinal directions, or an oblique direction, for example. The compression encoding section 28 may internally generate an I frame and a P frame. The above-mentioned partial image that is smaller than one frame may be a partial image of the I frame, or may be a partial image of the P frame. The compression encoding section 28 outputs data regarding the compression-encoded partial image to the packetizing section 34.

The scene analyzing section A 30 of the compression encoding section 28 performs a scene analysis process which is originally to be performed for compression encoding. For example, by performing the scene analysis process, the scene analyzing section A 30 obtains an intra-analysis result (plane similarity), an inter analysis result (motion vector), a CU allocation consideration result, and a scene segmentation result. Results of the scene analysis process obtained by the scene analyzing section A 30 include an analysis result which cannot be obtained when reference to compression-encoded data only is made. It is to be noted that results of the scene analysis process according to the embodiment may include analysis target image identification information with which an image (partial image in the embodiment) to be analyzed can be identified. This similarly applies to the following scene analysis results and scene information.

The scene analyzing section B 26 of the server 12 performs a scene analysis process, which is originally necessary for a super-resolution process, by referring to image (frame) data stored in the buffer 24 (frame buffer). In parallel with the compression encoding process at the compression encoding section 28, the scene analyzing section B 26 performs a scene analysis process, whereby a processing time is concealed. In addition, during the scene analysis process, the scene analyzing section B 26 acquires, as a hint for a super-resolution process, drawn contents of a game application stored in the buffer 24 (frame buffer).

In addition, during the scene analysis process, the scene analyzing section B 26 may further acquire, as a hint for a super-resolution process, contents drawn by an OS (Operating System) or an application other than the game application stored in the buffer 24 (frame buffer). The hint for a super-resolution process is information indicating the type of an image such as a menu UI (User Interface) or a caption which is drawn by a game application or OS, the shape of the image, or the coordinate position of the image, for example. This information may include information (e.g. a table) regarding an image obtained by adding (overlaying) additional content such as a menu UI or a caption to an image of main content (e.g. a character in a game) of the application and regarding an α value that indicates the image coordinate position and the transparency of the additional content to be added to the image of the main content.

The scene-information acquiring section 32 of the server 12 acquires a result of the scene analysis process performed by the scene analyzing section A 30 and a result of the scene analysis process performed by the scene analyzing section B 26. In addition, the scene-information acquiring section 32 acquires, from the content deciding section 20, information indicating contents of a scene to be drawn of the game application. The information indicating contents of a scene may include the arrangement state of a 3D (three dimensional) object, texture characteristics to be used, and scene segmentation information, for example. The scene-information acquiring section 32 outputs, to the packetizing section 34, scene information (hereinafter, also referred to as "first scene information") that includes the result of the scene analysis process performed by the scene analyzing section A 30, the result of the scene analysis process performed by the scene analyzing section B 26, and the information indicating contents of a scene obtained from the content deciding section 20.

The packetizing section 34 of the server 12 packetizes data regarding a compression-encoded partial image outputted from the compression encoding section 28 and the first scene information outputted from the scene-information acquiring section 32, and outputs the resultant data to the communication section 36. The communication section 36 of the server 12 transmits the packet data outputted from the packetizing section 34, to the client terminal 14 over a communication network. The packetizing section 34 and the communication section 36 of the server 12 can be regarded as transmission sections for transmitting data to the client terminal 14.

The communication section 40 of the client terminal 14 receives packet data transmitted from the server 12 over the communication network. The data acquiring section 42 of the client terminal 14 acquires (reconstructs) the compression-encoded partial image data and the first scene information on the basis of the packet data received by the communication section 40. The data acquiring section 42 outputs data regarding the compression-encoded partial image to the expansion decoding section 44, and outputs the first scene information to the scene-information integrating section 52.

The expansion decoding section 44 of the client terminal 14 obtains the original partial image by performing an expansion decoding process on the compression-encoded data regarding the partial image. The expansion decoding section 44 outputs the expansion-decoded partial image to the super-resolution processing section 48. The encoding-method acquiring section 46 of the expansion decoding section 44 obtains scene information (hereinafter, also referred to as "second scene information") that is included in the data regarding the compression-encoded partial image. In other words, the encoding-method acquiring section 46 acquires, from information (which can be regarded as a configuration result) which is for use in an expansion decoding process and which indicates a configuration of a compression encoding process at the server 12, second scene information regarding a partial image to be expansion-decoded. The second scene information includes a frame type (such as I frame or P frame), a QP (Quantization Parameter) value, a motion vector, and CU allocation information. The encoding-method acquiring section 46 outputs the second scene information to the scene-information integrating section 52.

The super-resolution processing section 48 of the client terminal 14 executes a super-resolution process (enhancement of the resolution and enhancement of the image quality, for example) on a partial image inputted from the expansion decoding section 44. The super-resolution processing section 48 may be implemented by a CPU and/or a GPU executing a computer program having a super-resolution process logic mounted thereon.

The scene analyzing section C 50 of the super-resolution processing section 48 performs a scene analysis process which is a process prior to the super-resolution process by using a publicly known technology. Specifically, the scene analyzing section C 50 analyzes a partial image deteriorated as a result of the compression-encoding and/or reduction of the resolution. The scene analyzing section C 50 may further perform a scene analysis process that is similar to that performed by the scene analyzing section B 26 of the server 12. The scene analyzing section C 50 outputs, as third scene information, a result of the scene analysis process to the scene-information integrating section 52.

The scene-information integrating section 52 integrates a plurality of types of scene information indicating features in a specific partial image. Specifically, the scene-information integrating section 52, by integrating the first scene information inputted from the data acquiring section 42, the second scene information inputted from the encoding-method acquiring section 46, and the third scene information inputted from the scene analyzing section C 50, on the basis of image identification information included in these pieces of scene information, obtains scene information (integrated scene information) regarding the above-mentioned specific partial image. It is to be noted that any one of the first scene information, the second scene information, and the third scene information may be lacked, and the scene-information integrating section 52 may integrate inputted scene information among the first scene information, the second scene information, and the third scene information. The super-resolution processing section 48 executes a super-resolution process on an inputted partial image, on the basis of the scene information which has been integrated by the scene-information integrating section 52 and corresponds to the partial image. A specific example of the super-resolution process will be explained later.

The display control section 54 of the client terminal 14 sequentially outputs a plurality of partial images having undergone the super-resolution process at the super-resolution processing section 48, to the display panel 56, so that the images are displayed on the display panel 56.

In this manner, the data acquiring section 42 of the client terminal 14 acquires data regarding a video to be displayed on the display panel 56, in units of partial image which is smaller than one frame. The super-resolution processing section 48 of the client terminal 14 executes a super-resolution process in units of partial image acquired by the data acquiring section 42. The display control section 54 of the client terminal 14 sequentially outputs partial images having undergone the super-resolution process at the super-resolution processing section 48, to the display panel 56. With the client terminal 14 according to the embodiment, delay in a super-resolution process can be suppressed.

In addition, the super-resolution processing section 48 of the client terminal 14 executes a super-resolution process on an inputted image on the basis of scene information indicating a feature in the image. The display control section 54 of the client terminal 14 outputs the image having undergone the super-resolution process at the super-resolution processing section 48, to the display panel 56. The above scene information (the first scene information to third scene information, for example) is previously acquired at a process prior to a super-resolution process to be executes on a super-resolution process target image. With the client terminal 14 according to the embodiment, the type of a scene is previously grasped, whereby a super-resolution process that is the most suitable for the scene can be selectively executed while a processing time of the super-resolution processing section is suppressed. Accordingly, delay in the super-resolution process can be suppressed while enhancement of the image quality is achieved.

In addition, the image generating section 22 of the server 12 generates a video of an application in units of frame. The compression encoding section 28 of the server 12 compression-encodes an image (e.g. a game scene image) generated by the image generating section 22, in units of partial image which is smaller than one frame. Transmission sections (e.g. the packetizing section 34 and the communication section 36) of the server 12 transmit the compression-encoded partial images to the client terminal 14 that executes a super-resolution process for each of the partial image. With the server 12 according to the embodiment, delay in the super-resolution process at the client terminal 14 can be suppressed.

In addition, the image generating section 22 of the server 12 generates an image of an application. The scene-information acquiring section 32 of the server 12 acquires scene information (the first scene information, for example) indicating a feature in the image generated by the image generating section. The transmission sections of the server 12 transmit the image data and the scene information to the client terminal 14, so that the client terminal 14 executes a super-resolution process for the above image on the basis of the above scene information. With the server 12 according to the embodiment, an efficient super-resolution process can be executed at the client terminal 14, and delay in the super-resolution process at the client terminal 14 can be suppressed.

Figure 2:
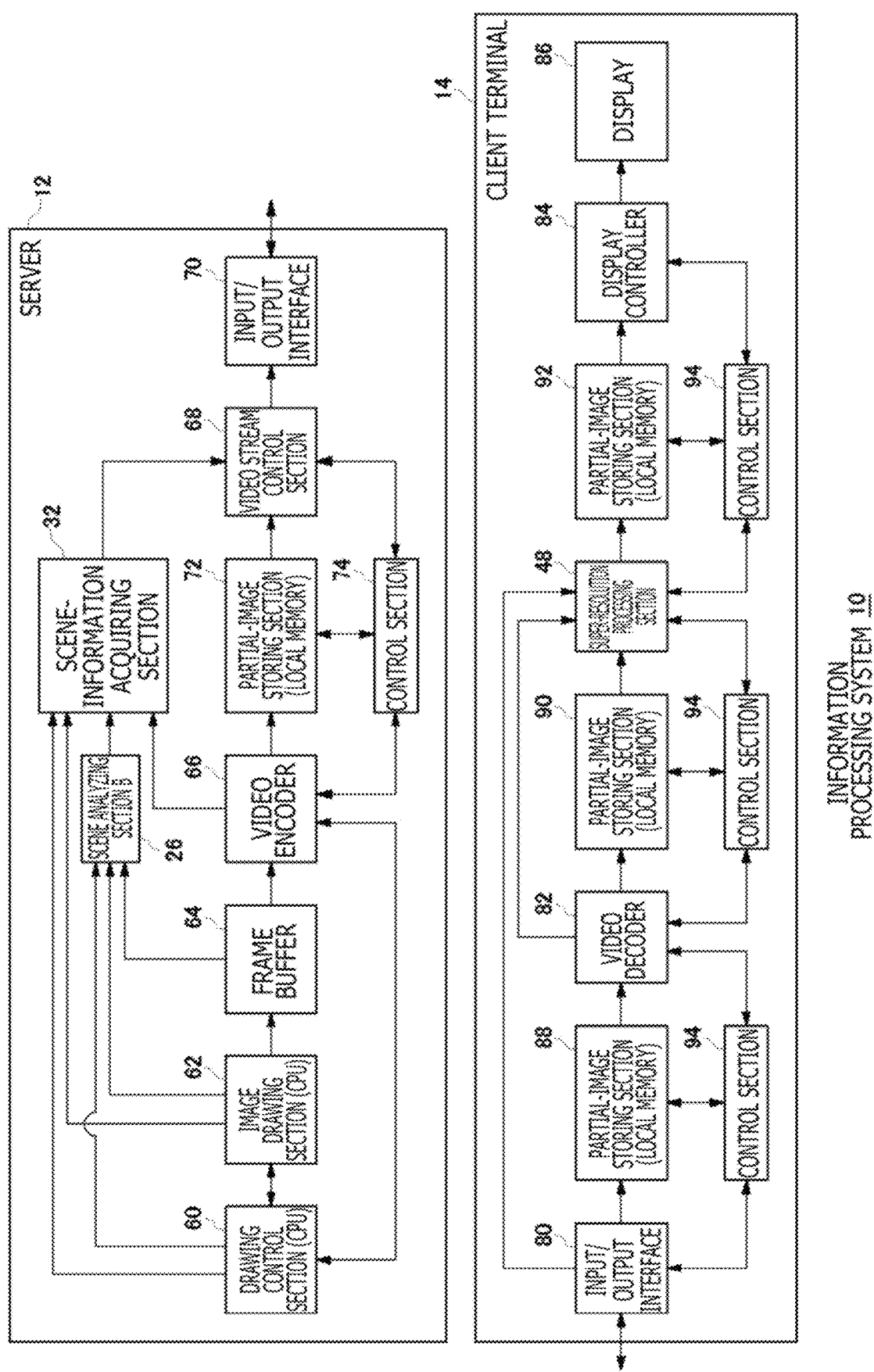
FIG. 2 is a block diagram depicting a configuration of the information processing system according to the first embodiment.

FIG. 2 is also a block diagram depicting a configuration of the information processing system 10 according to the embodiment. Of the functional blocks of the information processing system 10 in FIG. 2, ones identical to those of the information processing system 10 in FIG. 1 are denoted by the same reference signs.

A drawing control section 60 of the server 12 in FIG. 2 corresponds to the content deciding section 20 in FIG. 1. An image drawing section 62 of the server 12 in FIG. 2 corresponds to the image generating section 22 in FIG. 1. A frame buffer 64 of the server 12 in FIG. 2 corresponds to the buffer 24 in FIG. 1. A video encoder 66 of the server 12 in FIG. 2 corresponds to the compression encoding section 28 in FIG. 1. A video stream control section 68 of the server 12 in FIG. 2 corresponds to the packetizing section 34 in FIG. 1. An input/output I/F (interface) 70 of the server 12 in FIG. 2 corresponds to the communication section 36 in FIG. 1.

The server 12 further includes a partial-image storing section 72 and a control section 74. The partial-image storing section 72 stores data regarding a compression-encoded partial image outputted from the video encoder 66. The control section 74 may be implemented by a CPU. The control section 74 controls the start and the end of a process in each functional block. The control section 74 further controls process synchronization among the functional blocks, and also controls data exchange between the functional blocks (flow control).

An input/output I/F 80 of the client terminal 14 in FIG. 2 corresponds to the communication section 40 and the data acquiring section 42 in FIG. 1. A video decoder 82 of the client terminal 14 in FIG. 2 corresponds to the expansion decoding section 44 in FIG. 1. A display controller 84 of the client terminal 14 in FIG. 2 corresponds to the display control section 54 in FIG. 1. A display 86 of the client terminal 14 in FIG. 2 corresponds to the display panel 56 in FIG. 1.

The client terminal 14 further includes a partial-image storing section 88, a partial-image storing section 90, a partial-image storing section 92, and a control section 94. The partial-image storing section 88 stores data regarding a partial image acquired by the input/output I/F 80 (in other words, transmitted from the server 12). The partial-image storing section 90 stores data regarding a partial image expansion-decoded by the video decoder 82. The partial-image storing section 92 stores data regarding a partial image having undergone a super-resolution process at the super-resolution processing section 48. The control section 94 controls the start and the end of a process in each functional block. The control section 94 controls process synchronization among the functional blocks, and also controls data exchange between the functional blocks (flow control).

The client terminal 14 may further include, although not illustrated in FIG. 2, an image processing section. The image processing section may perform at least one of (1) a process of combining multiple planes, (2) a color space converting process, and (3) a resolution converting process, on a partial image stored in the partial-image storing section 90 or the partial-image storing section 92.

Figure 3:
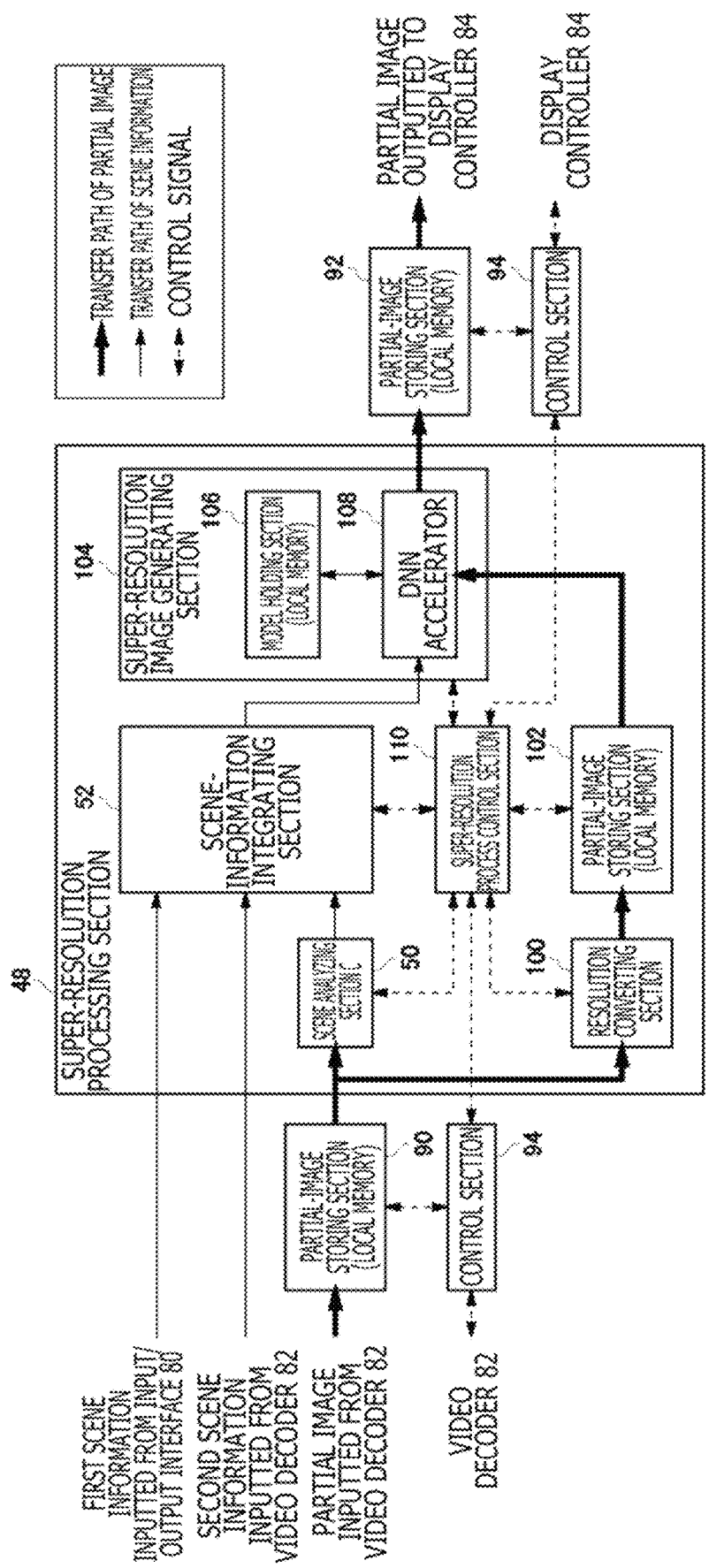
FIG. 3 is a block diagram depicting a detailed configuration of a super-resolution processing section in FIG. 2.

FIG. 3 is a block diagram depicting the detailed configuration of the super-resolution processing section 48 in FIG. 2. The super-resolution processing section 48 includes the scene analyzing section C 50, the scene-information integrating section 52, a resolution converting section 100, a partial-image storing section 102, a super-resolution image generating section 104, and a super-resolution process control section 110.

The super-resolution process control section 110 performs synchronization control, timing control, and flow control by transmitting control signals to the other functional blocks in the super-resolution processing section 48. The resolution converting section 100 converts the resolution of an expansion-decoded partial image outputted from the video decoder 82. Specifically, the resolution converting section 100 increases the resolution of the partial image in a publicly known manner such as interpolation, and stores the obtained high-resolution partial image into the partial-image storing section 102. The super-resolution image generating section 104 reads out a partial image stored in the partial-image storing section 102, and increases the quality of the read partial image by performing a filtering process or image decompression/reconstruction on the partial image.

The super-resolution image generating section 104 includes a model holding section 106 and a DNN (Deep Neural Network) accelerator 108. The model holding section 106 stores a model that is for a super-resolution process and that is generated by deep learning which will be described later in reference to FIG. 6. The model may be a formula/function in which an algorithm for a super-resolution process (image filtering process, image decompression/reconstruction, etc.) is mounted.

The DNN accelerator 108 reads out, from the partial-image storing section 102, a high-resolution partial image obtained by the resolution converting section 100, and increases the quality of the partial image that has been read out, on the basis of the model stored in the model holding section 106. The DNN accelerator 108 outputs the obtained high-quality partial image to the partial-image storing section 92.

In a modification, the model holding section 106 may store a model generated by machine learning which will be described later in reference to FIG. 5. In addition, the resolution converting section 100 may perform a resolution converting process by referring to at least one of the first scene information, the second scene information, and the third scene information that is outputted by the scene analyzing section C 50. In addition, the resolution converting section 100 may be disposed on the post-stage of the super-resolution image generating section 104. That is, the resolution converting section 100 may increase the resolution of the high-quality partial image obtained by the super-resolution image generating section 104. In addition, the super-resolution processing section 48 may have a configuration that does not include the resolution converting section 100. That is, the super-resolution processing section 48 may be configured not to execute the resolution converting process. In addition, the resolution converting section 100 may be omitted from the super-resolution processing section 48, and the super-resolution image generating section 104 may be configured to increase the quality of a partial image and convert the resolution of the partial image simultaneously.

Figure 4:
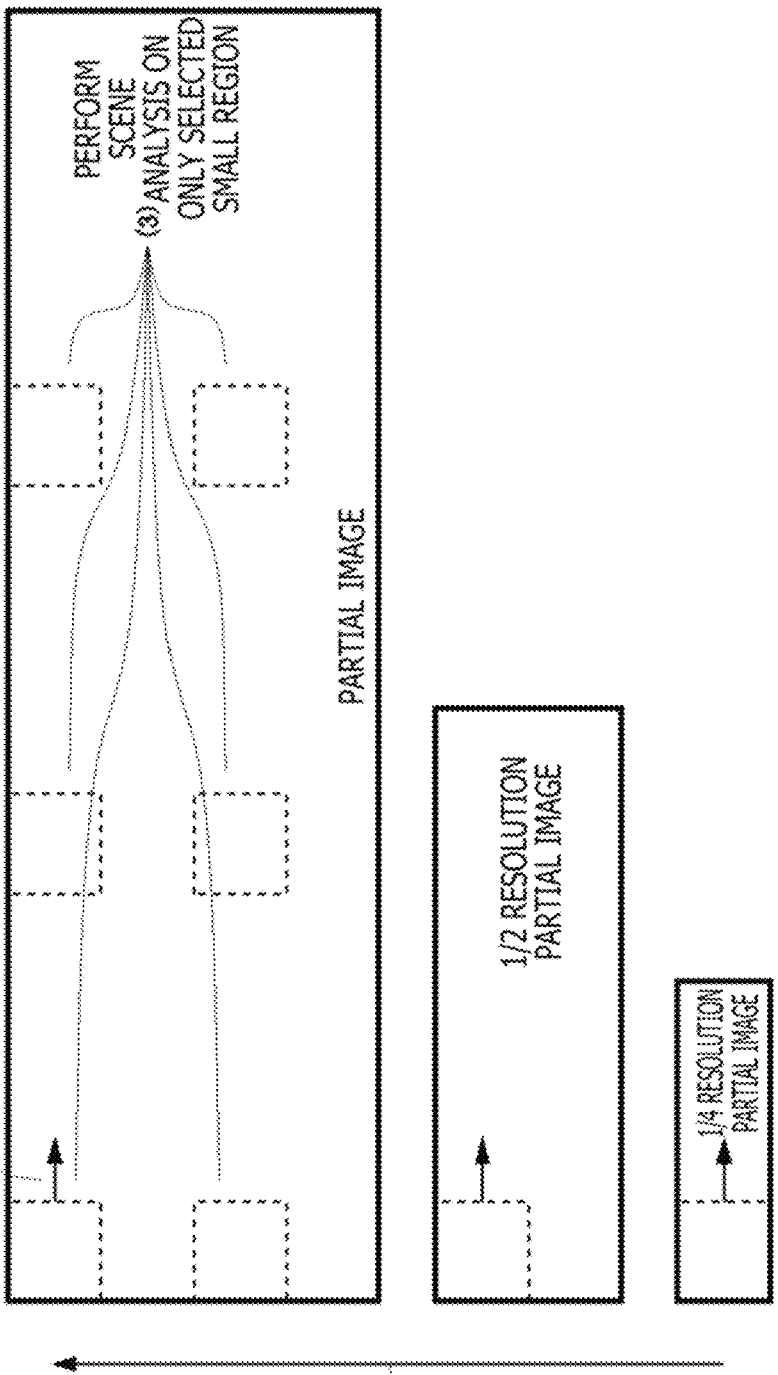
FIG. 4 is a diagram schematically depicting a method for reducing delay of a scene analysis process.

FIG. 4 schematically depicts a method for reducing delay of a scene analysis process. As previously explained in reference to FIG. 3, etc., the super-resolution processing section 48 performs internal processes including a scene analysis process, a scene information integrating process, an image-resolution enhancement (upscaling) process, an image filtering process, and an image decompression/reconstruction process, etc. As illustrated in (1) of FIG. 4, the super-resolution processing section 48 performs these internal processes in units of partial image. It is desirable that a multiple of a unit granularity of each internal process in the super-resolution processing section 48 be equal to a unit of partial image. In FIG. 4, a unit granularity of each internal process is indicated by a dotted rectangle (hereinafter, also referred to as "analysis unit granularity").

Also, as illustrated in (2) of FIG. 4, the super-resolution processing section 48 converts an inputted image to a plurality of types of low-resolution partial images by pyramid scaling during a scene analysis (the scene analyzing section C 50). Then, the super-resolution processing section 48 performs a scene analysis process on the partial images in order from a partial image with relatively low resolution to a partial image with relatively high resolution.

The super-resolution processing section 48 (the scene analyzing section C 50) sequentially outputs results of the scene analysis of the partial images having a plurality of resolutions to the scene-information integrating section 52 without waiting for completion of the analysis of all the partial images having different resolutions. Accordingly, the super-resolution image generating section 104 can start a process of generating super-resolution images quickly. In a case where results of the scene analysis sufficient to generate super-resolution images have been obtained, the super-resolution image generating section 104 issues a notification about this to the scene analyzing section C 50. After receiving the notification, the scene analyzing section C 50 abandons the scene analysis process of the high-resolution partial images. In other words, the scene analyzing section C 50 abandons an uncompleted process. It is to be noted that, even after the super-resolution image generating section 104 starts a super-resolution image generating process, the scene analyzing section C 50 may continue the scene analysis process on higher-resolution partial images, and may additionally provide the analysis result to the super-resolution image generating section 104.

Figure 11:
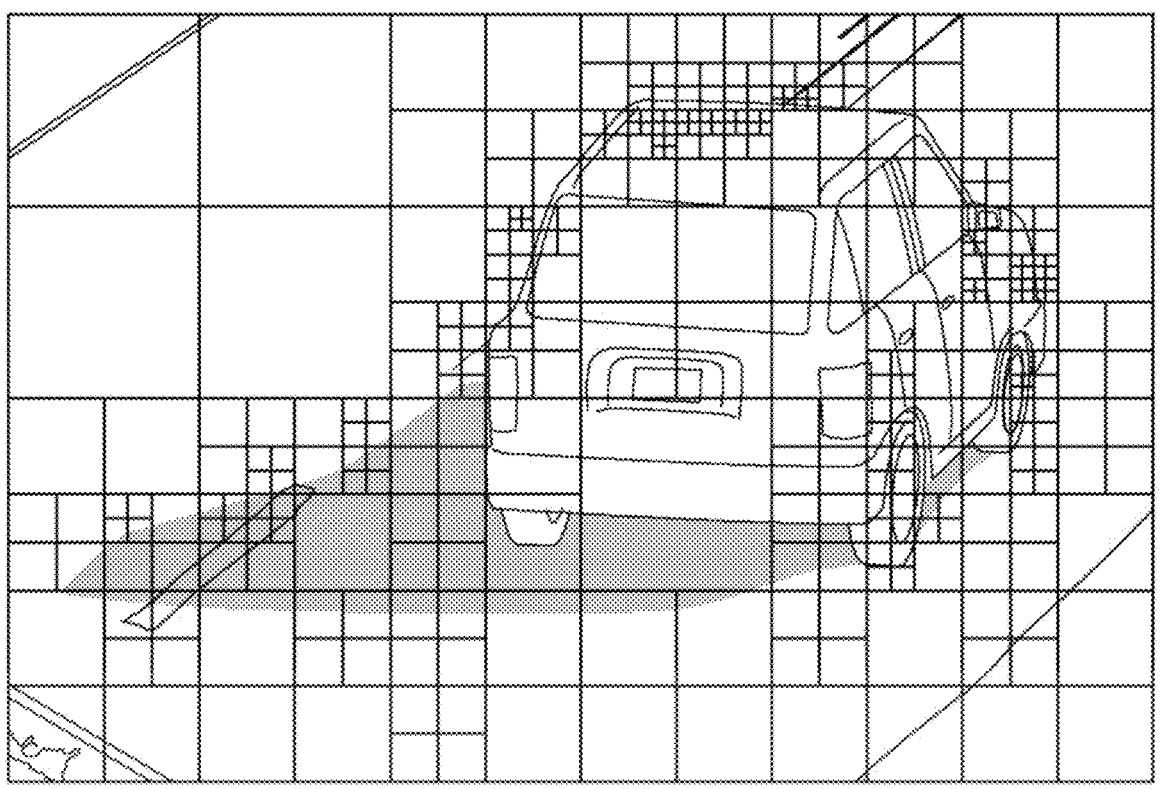
FIG. 11 is a diagram depicting an example of CU (Coding Unit) unit allocation information.

Also, as illustrated in (3) of FIG. 4, the super-resolution processing section 48 (the scene analyzing section C 50) extracts, during the scene analysis, a plurality of images of small regions (regions of an analysis unit granularity, for example) sampled, at an original resolution, from discrete positions in an inputted image. This extraction process may be performed according to the following policies. That is, for allocation of discrete "regions of analysis unit granularity," at least one of the policies (a) to (d) may be adopted. (a) One region of an analysis unit granularity is allocated to one CU with use of CU allocation information, as illustrated in FIG. 11 which will be explained later.

(b) In allocation of a limited number of "regions of analysis unit granularity" in a case where each of a plurality of regions in the inputted image is calculated on the basis of a score calculation rule regarding a scene analysis illustrated in FIG. 10 which will be explained later, a "region of analysis unit granularity" is selectively allocated to an image region having a higher score. (c) In allocation of a limited number of "regions of analysis unit granularity" in a case where each of a plurality of regions in the inputted image is calculated on the basis of a score calculation rule (human skin inference process) regarding a scene analysis illustrated in FIG. 13 which will be explained later, a "region of analysis unit granularity" is selectively allocated to an image region having a higher score. In (b) and (c), for example, a region of analysis unit granularity may be more preferentially allocated to an image region having a relatively high score, rather than an image region having a relatively low score. In addition, a region of analysis unit granularity may be more preferentially allocated to an image region having a higher score. The selective allocation or the preferential allocation may be equivalent to allocation of relatively a large number of "regions of analysis unit granularity."

(d) A larger number as a total allocation number of "regions of analysis unit granularity" per partial image is set in an I frame. Setting a larger number as the total allocation number may be setting the total allocation number to be greater than the initial value thereof, or may be setting the total allocation number to be greater than the total allocation number of a frame other than the I frame. For example, in a case where a partial image of an I frame is inputted, the super-resolution processing section 48 (the scene analyzing section C 50) may set a large number as the total allocation number of regions of analysis unit granularity in the partial image, compared to a case where a partial image of a frame other than an I frame is inputted. The super-resolution processing section 48 (scene analyzing section C 50) performs a scene analysis only on the plurality of small regions extracted. With the configuration illustrated in (1) to (3) in FIG. 4, a load of a scene analysis can be reduced, and further, a processing time can be suppressed.

Figure 5:
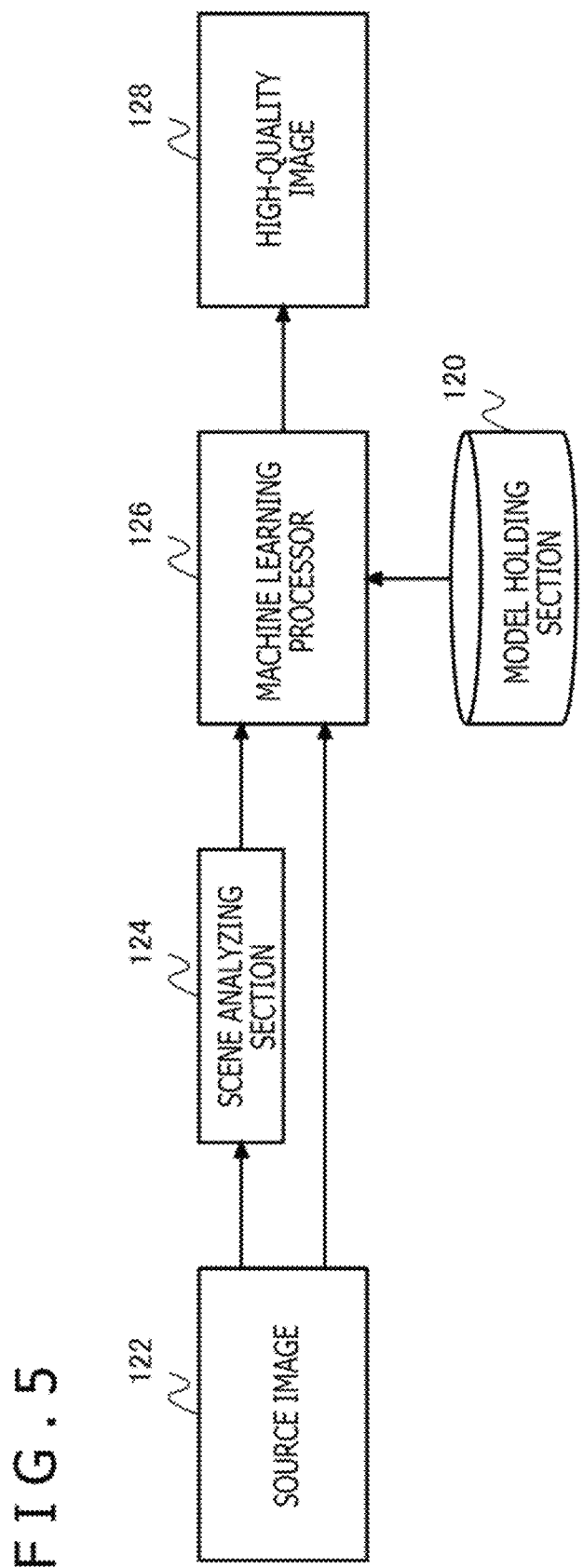
FIG. 5 is a diagram schematically depicting a super-resolution process based on machine learning.

FIG. 5 schematically depicts a super-resolution process based on machine learning. A source image 122 is an image that has not undergone a super-resolution process, and the resolution and the image quality of the source image 122 (partial image in the embodiment) are relatively low. A high-quality image 128 is an image having undergone a super-resolution process, and the resolution and the image quality of the high-quality image 128 (partial image in the embodiment) are relatively low. The model holding section 120 corresponds to the model holding section 106 in FIG. 3.

The model holding section 120 stores a model created by off-line machine learning, for example.

Off-line machine learning and a model created by the learning may have at least one of the following features (a) to (e). (a) Off-line learning is performed previously. (b) During the learning, a "high definition image having a target quality to be obtained as a result of a super-resolution process" and a "scene analysis result of the high definition image" are used as teacher data. (c) When learning is performed and an inference is made (that is, when a high-quality image is generated by use of a machine learning processor or a deep learning processor), a "scene analysis result" is additionally inputted. As a result, compared to a case where only a source image is inputted, the model learning convergence is enhanced, the model accuracy is enhanced, and upsizing of the model and an increase in the inference process time are suppressed, whereby a proper super-resolution process can be executed. (d) In particular, the first scene information and the second scene information are used for a scene analysis, and a feature amount which is a result of the scene analysis is used for learning and inference in a super-resolution process. As a result, an image quality before the video quality is degraded, the resolution is lowered, or the color space is reduced, for example, due to lossy compression encoding can be reproduced. (e) In place of the scene analysis result, scene information itself may be directly inputted to learning and inference, and thus, the similar effect may be aimed to be achieved.

A scene analyzing section 124 corresponds to the scene analyzing section A 30, the scene analyzing section B 26, the scene analyzing section C 50, and the scene-information integrating section 52 in FIG. 1. The scene analyzing section 124 may calculate a feature amount in the source image 122, and classify a local sub-block which is larger than that in conventional super-resolution, under a plurality of categories (thousands of categories, for example) on the basis of the feature amount. The scene analyzing section 124 may classify (content included in) the source image 122 as a sky, a cloud, a face, a desert, or a machine structure, for example. The above feature amount may include a feature amount for detecting an undesirable side effect (e.g. noise) caused by image compression.

A machine learning processor 126 corresponds to the DNN accelerator 108 in FIG. 3. The machine learning processor 126 performs an image converting process or an image reconfiguration process on the basis of a scene analysis result obtained by the scene analyzing section 124. The machine learning processor 126 may perform various types of filtering processes and resolution conversion for anti-alias, sharpness, noise rejection, and contrast enhancement. The machine learning processor 126 may change a parameter for the filtering, conversion, and reconfiguration, according to a classified sub-block region.

The processing granularity may be set to a frame for detecting an object, or a partial image that is smaller than a frame. In addition, a combination of an algorithm and a parameter previously created by a person or by machine learning may be prepared, and the machine learning processor 126 may select a combination of an algorithm and a parameter according to the scene analysis result. Some algorithms may use a time approach for detection of a motion vector and for 3DNR (3D Digital Noise Reduction).

Figure 6:
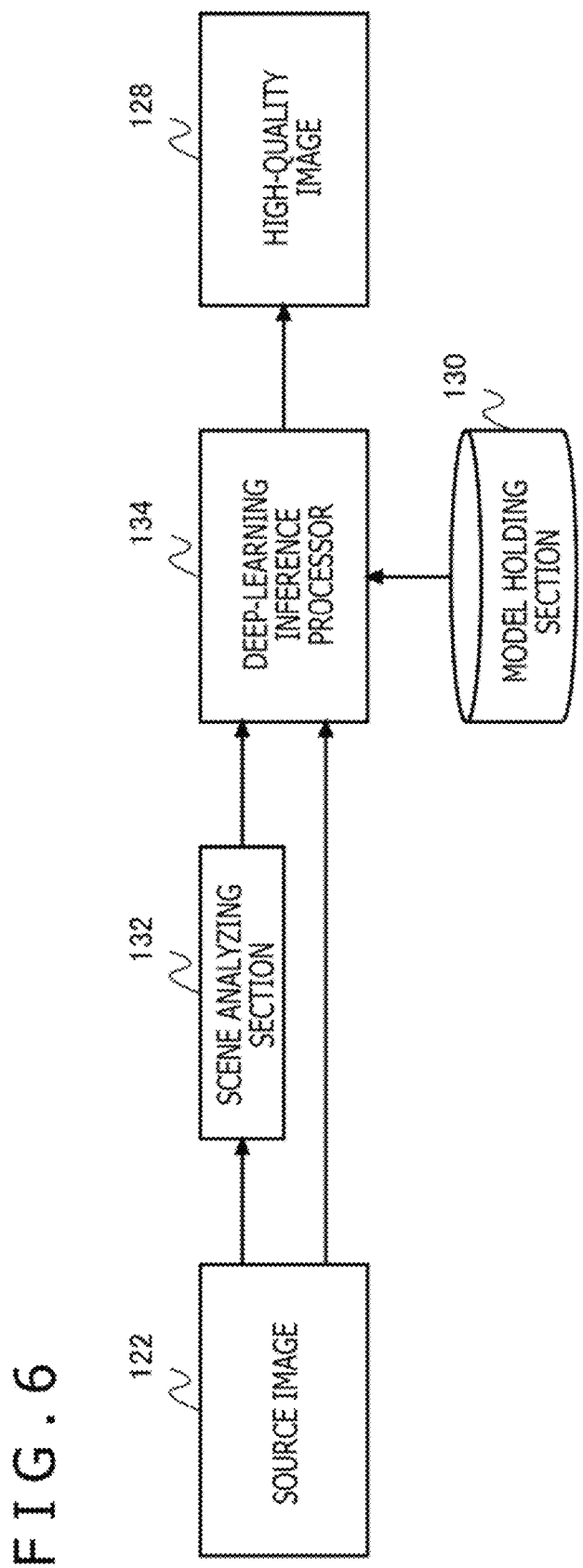
FIG. 6 is a diagram schematically depicting a super-resolution process based on deep learning.

FIG. 6 schematically depicts a super-resolution process based on deep learning. A model holding section 130 corresponds to the model holding section 106 in FIG. 3. The model holding section 130 stores a DNN model created by off-line deep learning, for example. Off-line deep learning and a DNN model created by the learning may have at least one of the features (a) to (e) of the off-line machine learning and the model created by the learning, which have been explained in reference to FIG. 5.

A scene analyzing section 132 corresponds to the scene analyzing section A 30, the scene analyzing section B 26, the scene analyzing section C 50, and the scene-information integrating section 52 in FIG. 1. The scene analyzing section 132 may calculate a feature amount in the source image 122, and classify a local sub-block under a plurality of categories (thousands of categories, for example) on the basis of the feature amount. The scene analyzing section 132 may categorize (content included in) the source image 122 as a sky, a cloud, a face, a desert, or a machine structure, for example. The above feature amount may include a feature amount for detecting an undesirable side effect (e.g. noise) caused by image compression.

A deep-learning inference processor 134 corresponds to the DNN accelerator 108 in FIG. 3. The deep-learning inference processor 134 performs an image converting process and an image reconfiguration process on the basis of a result of the scene analysis obtained by the scene analyzing section 132. The deep-learning inference processor 134 typically uses a DNN model for scene classification and image conversion/reconfiguration. In a modification, the deep-learning inference processor 134 may use a combination of a DNN model and another algorithm (e.g. a human-based scene analysis algorithm or a super-resolution algorithm). The deep-learning inference processor 134 may perform various types of filtering processes for anti-alias, sharpness, noise rejection, and contrast enhancement. The deep-learning inference processor 134 may change a parameter for the filtering, conversion, and reconfiguration, according to a classified sub-block region.

Even if a DNN model has been learned on a floating point basis, the learned DNN model is optimized for an integer-based inference accelerator. A processing granularity may be set to a frame for detecting an object, or a partial image which is smaller than a frame. Some algorithms may use a temporal approach for motion vector detection and 3DNR.

The method for executing a super-resolution process will be further explained.

The super-resolution image generating section 104 of the super-resolution processing section 48 executes a super-resolution process for a partial image on the basis of scene information corresponding to the partial image. The super-resolution image generating section 104 of the super-resolution processing section 48 uses the scene information in order to dynamically change a process for increasing the definition of an image according to the image region (i.e. contents included in the partial image). Hereinafter, some cases of a process that is performed by the super-resolution image generating section 104 will be explained.

(Case 1)

When an image region to be processed represents a picture including flat contents with less variation (e.g. a picture of a cloudless blue sky, or a bird's eye view picture of a surface of a well-paved road), the super-resolution image generating section 104 minimizes an execution amount of an image conversion process for sharpness. In other words, the super-resolution image generating section 104 sets an execution amount of an image conversion process for sharpness to be less than that when the image region represents a picture including non-flat contents with more variation. In a case where the image region represents a picture including flat contents with less variation, the effect of a process for sharpness becomes large. This is because, as a result, an artificial filtering process result is likely to become conspicuous. In other words, an adverse effect of the artificial filtering process is likely to become conspicuous.
(Case 2)
When an image region to be processed represents a picture including contents with high density and intermittent variation (e.g. a picture of a forest seen in a bird's eye view), the super-resolution image generating section 104 aggressively performs an image conversion process for sharpness. In other words, the super-resolution image generating section 104 sets an execution amount of an image conversion process for sharpness to be larger than that when the image region represents a picture including contents with non-high density and non-intermittent variation. This is because, in a case where the image region represents a picture including contents with high density and intermittent variation, an effect of a process for sharpness is unlikely to become apparent, and further, an adverse effect of an artificial filtering process is unlikely to become conspicuous.
(Case 3)
When an image region to be processed represents a picture of a clear line or point (e.g. an artificial object or character having a complicated shape the contour of which is clear), the super-resolution image generating section 104 refrains from performing an image conversion process for sharpness. The super-resolution image generating section 104 may skip an image conversion process for sharpness. This is because, in a case where the image region represents a picture of a clear line or point, an effect of a process for sharpness is weak and an adverse effect of an artificial filtering process is likely to become very conspicuous. It is preferable that, on an image region of such a type, the super-resolution image generating section 104 perform a special contour correcting process according to the type of the line or point.
(Case 4)
When an image region to be processed includes an object (e.g. a vehicle) that is moving by a large moving amount, there may be little advantage in performing a definition enhancing process on a surface region of the object in view of the human dynamic visual acuity. However, if noise of a collapsed contour caused by image compression is included in an end of an object, human beings are likely to acknowledge the noise of the collapsed contour. Therefore, in a case of detecting noise of a collapsed contour in the image region to be processed, the super-resolution image generating section 104 performs an image conversion process specific to noise of a collapsed contour.
(Case 5)
Human beings have a great capacity to recognize the skin color and facial expression of a person included in an image. Therefore, in a case of detecting that an image region to be processed includes a person, the super-resolution image generating section 104 performs an image conversion process (filtering process) specific to the person.

A plurality of combinations of a determination rule and a corresponding filtering process or conversion process, such as those described in the above cases, may be defined. These combinations may be mounted in a table, a database, or a model. Further, various input conditions may be given to these combinations, results of the filtering process or conversion process may be trained and/or optimized. As a result of this, a process system in which contents of a generated super-resolution image are switched on the basis of scene information and contents of an inputted image can be realized.

It is to be noted that the super-resolution image generating section 104 may decide image conversion (contents of a filtering process or a conversion process) to be performed, on the basis of the scene information (the first to third scene information) only. Alternatively, the super-resolution image generating section 104 may decide contents of image conversion to be performed, on the basis of the scene information and an inputted image (partial image). According to which one of the above methods is adopted, the table, the database, or the model may be changed.

Referring back to FIG. 3, a super-resolution process that is executed by the super-resolution processing section 48 will be further explained. The scene-information integrating section 52 outputs scene information of each scene analysis unit granularity (the analysis unit granularity depicted in FIG. 4, for example) to the super-resolution image generating section 104. The scene-information integrating section 52 may accumulate scene information in a past frame or a past partial image, and may refer to the accumulated information when constructing scene information in the latest frame or the latest partial image. The super-resolution image generating section 104 may proceed with the process by a granularity that is equal to the scene analysis unit granularity, or may proceed with the process by any other granularity.

The super-resolution image generating section 104 may switch a model for use from among a plurality of models stored in the model holding section 106, on the basis of the scene information. In addition, in order to conceal a model switching time, the super-resolution image generating section 104 may (1) previously load a plurality of models into the model holding section 106, (2) start a plurality of DNN accelerators, and (3) dynamically switch at least either the previously loaded models or the previously started DNN accelerators. A model that is used by the super-resolution image generating section 104 may be previously trained and constructed so as to address scene information and an inputted image under various conditions. Accordingly, model switching according to scene information may be suppressed, or a model switching time may be suppressed. The super-resolution process control section 110 may use an identifier or the like in order to associate scene information (scene analysis result) with an image (partial image) to be paired.

Figure 7:
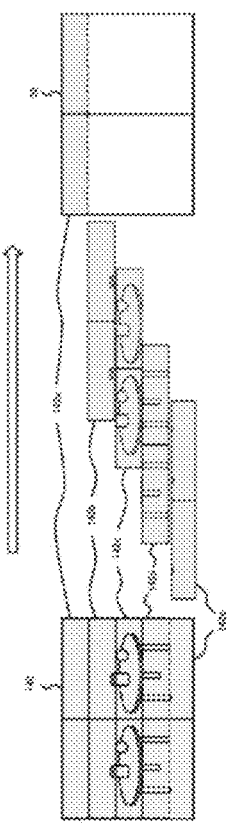
FIG. 7 is a conceptual diagram of a partial image-based pipeline process.

FIG. 7 is a conceptual diagram of a partial image-based pipeline process. As explained above, the server 12 generates a frame 140 of a video by a predetermined or variable rate. In the example depicted in FIG. 7, the frame 140 has a configuration in which an image for a left eye and an image for a right eye are represented in two equal left and right regions, respectively. However, the configuration of an image that is generated by the server is not limited to the depicted example.

As explained above, the server 12 compression-encodes each partial image in the frame 140. In FIG. 7, the image plan is horizontally divided into five parts, so that partial images 142*a*, 142*b*, 142*c*, 142*d*, and 142*e* are formed. In FIG. 7, the partial images 142*a*, 142*b*, 142*c*, 142*d*, and 142*e* are sequentially compression-encoded in this order, and are sequentially transmitted to the client terminal 14 to be displayed thereon, as indicated by an arrow. That is, while the uppermost partial image 142*a* is compression-encoded, transmitted, expansion-decoded, and outputted to the display panel 56, the partial image 142*b* under the partial image 142*a* and the next partial image 142*c* under the partial image 142*b* are sequentially transmitted and displayed. Accordingly, processes that are necessary from when an image is drawn until the image is displayed can be performed in parallel, so that display can proceed with the minimum delay even if transfer time is interposed.

Figure 8:
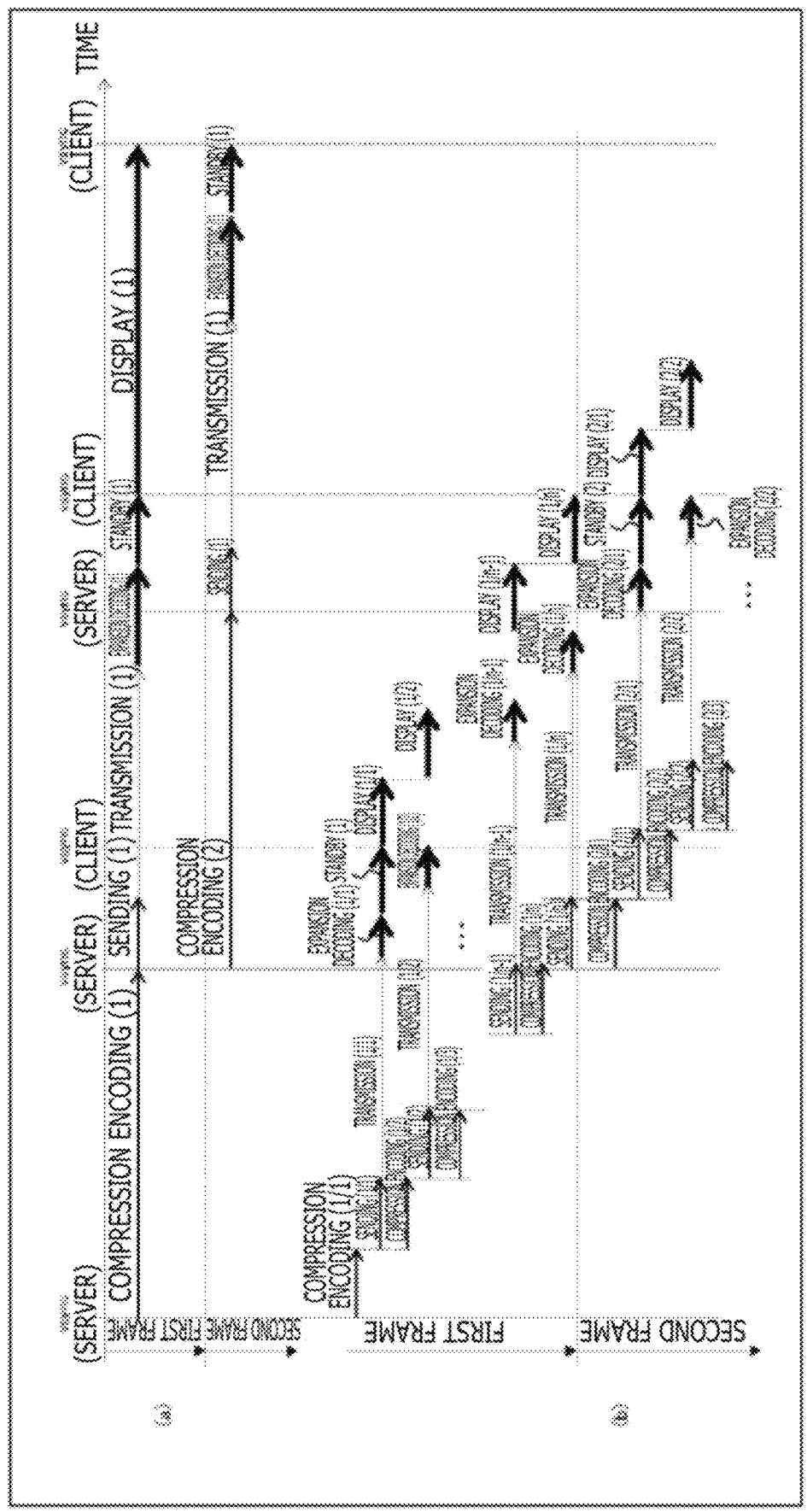
FIG. 8 is a conceptual diagram of a partial image-based pipeline process.

FIG. 8 is also a conceptual diagram of a partial image-based pipeline process. FIG. 8 is FIG. 6 of the past application (Japanese Patent Application No. 2019-213536) filed by the present applicant. FIG. 8 depicts process timings during a period of time from image generation at the server 12 to image display at the client terminal 14. In the client terminal 14 according to the present embodiment, a processing time of the super-resolution processing section, which is not depicted in FIG. 8, is added between an expansion decompression process and a display process. On the other hand, a process at the encoding-method acquiring section 46 of the expansion decoding section 44 is performed in the background of the expansion decoding process, whereby the processing time of the encoding-method acquiring section 46 can be concealed. Also in the server 12, the processes of the scene analyzing section A 30, the scene analyzing section B 26, and the scene-information acquiring section 32 are performed in the background of the compression encoding process at the compression encoding section 28, whereby the times of the processes at the scene analyzing section A 30, the scene analyzing section B 26, and the scene-information acquiring section 32 can be concealed. In addition, a process of outputting scene information from the data acquiring section 42 to the scene-information integrating section 52 can also be performed in the background of the expansion decoding process at the expansion decoding section 44.

Figure 9:
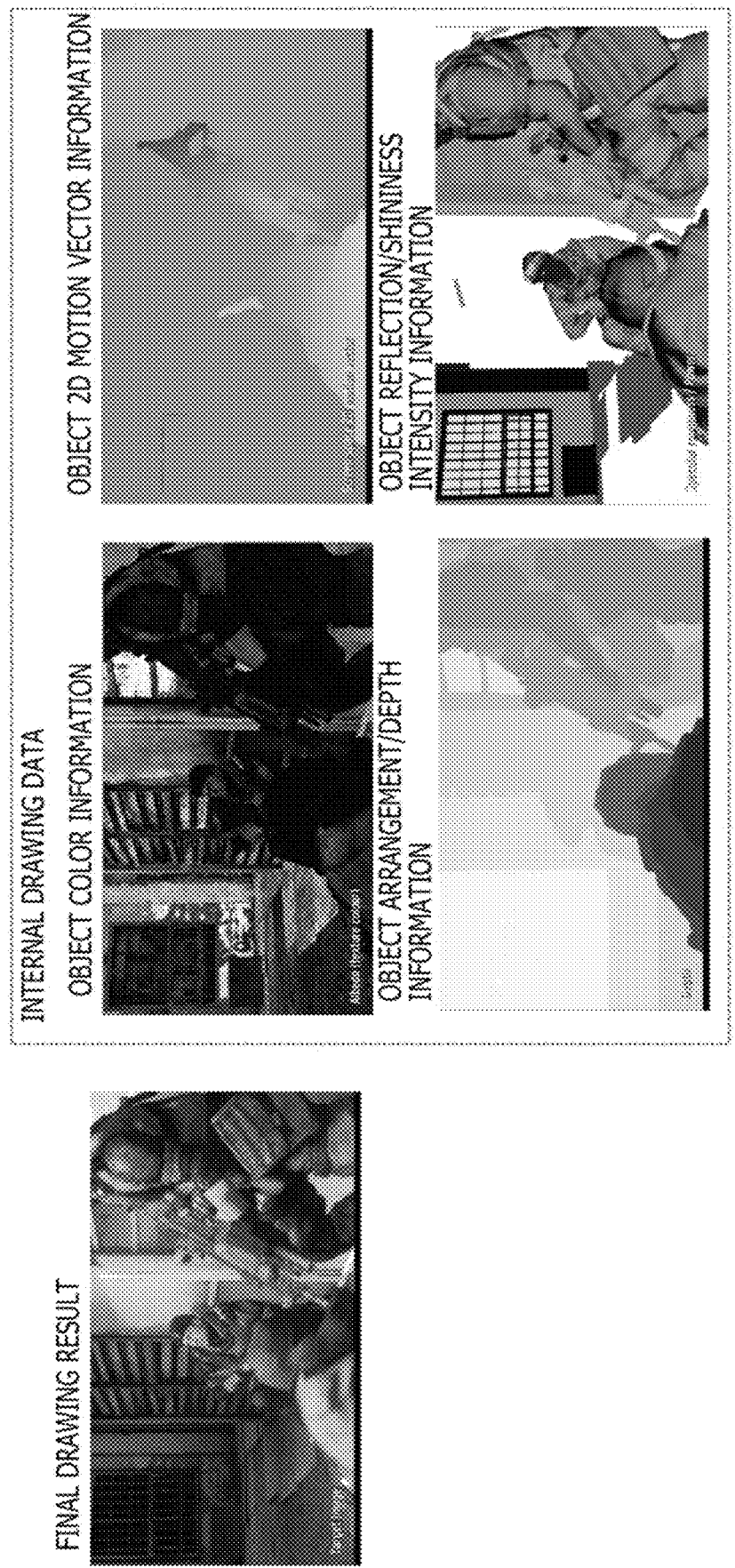
FIG. 9 is a diagram depicting an example of scene information held in a game application.

FIG. 9 depicts an example of scene information held in a game application. In a process of drawing a frame, the game application (or the content deciding section 20 and the image generating section 22 executing the game application) generates, as internal data, (1) color information regarding each object, (2) motion vector information regarding each object, (3) depth information regarding arrangement of objects, and (4) reflection shininess intensity information regarding each object. The content deciding section 20 and the image generating section 22 executing the game application store the above-mentioned internal data into the buffer 24 (rendering buffer). The scene analyzing section A 30 and the scene analyzing section B 26 may acquire, as scene information, the above-mentioned data (1) to (4) stored in the buffer 24 (rendering buffer). The term "shininess" in the present description is also called "highlight." It is to be noted that internal drawing data held in the application depicted in FIG. 9 has existed before the application generates a final drawing result, and a reference to the internal drawing data is made when the application generates a final drawing result.

In addition, in the information processing system 10 according to the embodiment, a scene analysis (scene segmentation, for example) is performed with reference to the above-mentioned data (1) to (4) before a super-resolution process is executed. Accordingly, reduction in process delay and enhancement of the accuracy of the scene analysis are achieved. It is to be noted that, in the example in FIG. 9, scene information regarding the position of an object that is largely moving in the front side, the position of an object exposed to light, a position in a dark place where black clipping takes place (a position where it is difficult to identify an object), or the like can also be obtained.

Figure 10:
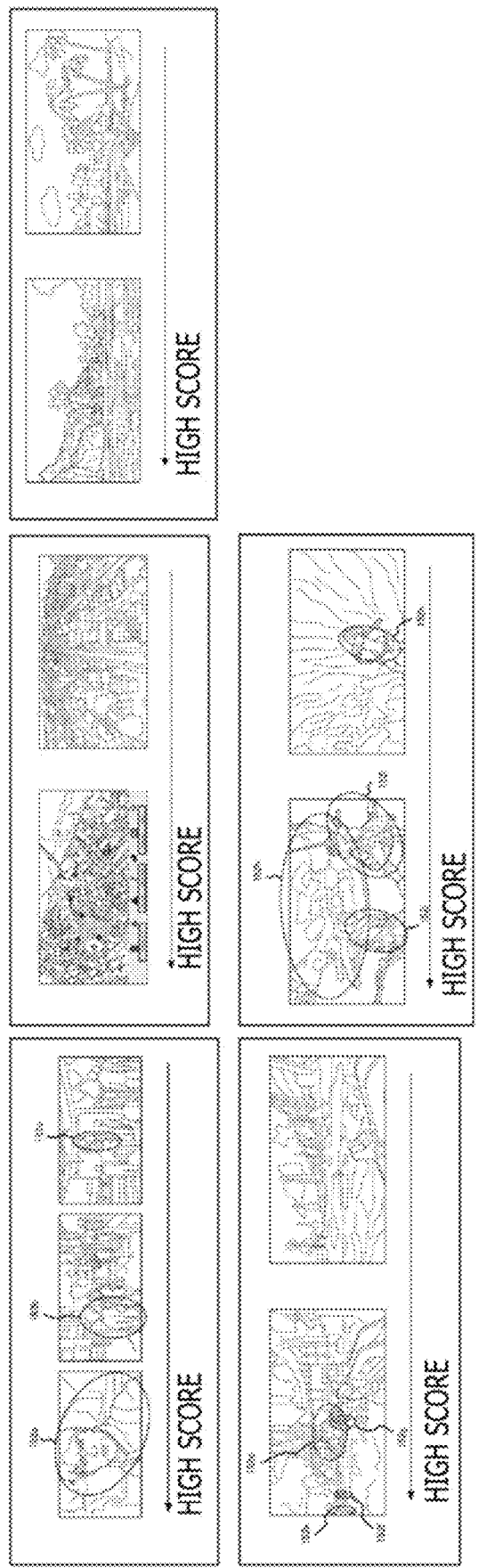
FIG. 10 is a diagram depicting an example of a scene analysis.

FIG. 10 depicts an example of a scene analysis. At least one of the scene analyzing section A 30 in the server 12, the scene analyzing section B 26 in the server 12, and the scene analyzing section C 50 in the client terminal 14 may perform a scene analysis by using a parameter group and a score calculation rule described in Japanese Patent Application No. 2019-179439 and Japanese Patent Application No. 2019-179440. FIG. 10 illustrates FIGS. 27 to 31 of Japanese Patent Application No. 2019-179439.

Parameters for use in a scene analysis (for example, determination on drawn contents in a game) may include at least one of the following items. (1) An optical flow amount (for example, the direction to which a pixel is moving and the moving speed of a pixel region). (2) An amount of encode Motion Estimation (ME) (for example, the direction to which a rectangular region is moving and the moving speed of the rectangular region). (3) The granularity of encode CU allocation (for example, the CU size). (4) Whether or not scene switching is performed (for example, whether or not an encode I frame is to be inserted).

(5) An image texture type (for example, an edge region, a flat region, or a High Density/Detail/Crowd region) occupying a screen. This texture type is not one used for 3D drawing but one distributed in a 2D image which is a drawn result. (6) A Harris corner feature point or an edge amount (for example, the coordinates of a feature point or an edge, and an edge intensity). (7) Depth data (for example, depth information regarding each pixel, or a Z value in a 3D game). (8) An object amount (for example, an amount of an object such as a chair or a vehicle, or the occupying size of the object in a screen). (9) A use amount in each level of a Mipmap texture used in 3D drawing.

(10) An LOD (Level of Detail) which is used in 3D drawing. (11) A use amount in each level in tessellation. (12) An amount of characters and symbols. (13) The type of a drawn scene. This type may be any one of a menu, a setting, a loading screen, an image drawn from a subjective visual line, an image drawn from a bird's eye visual line, a 2D pixel graphics game, a 3D drawing game, a first-person shooter game, a race game, a sport game, an action game, a simulation game, or an adventure novel game, for example.

For example, the score calculation rule may be any one of (1) a score calculation rule based on an image size in an image, (2) a score calculation rule based on the fineness of an object, (3) a score calculation rule based on a contrast and a dynamic range, (4) a score calculation rule based on movement of an image, and (5) a score calculation rule based on a texture type, as described in Japanese Patent Application No. 2019-179439 and Japanese Patent Application No. 2019-179440. Alternatively, the score calculation rule may be (6) a score calculation rule in which a resolution is regarded as important, (7) a score calculation rule in which a frame rate is regarded as important, or (8) a score calculation rule in which a QP value is regarded as important. At least one of the scene analyzing section A 30 in the server 12, the scene analyzing section B 26 in the server 12, and the scene analyzing section C 50 in the client terminal 14 may calculate a score for each unit region in an internal process in the super-resolution processing section 48, or for each partial image.

Moreover, at least one of the scene analyzing section A 30 in the server 12, the scene analyzing section B 26 in the server 12, and the scene analyzing section C 50 in the client terminal 14 may perform a scene analysis by using a parameter that is similar to that in Japanese Patent Application No. 2019-037907. This parameter may include at least one of a feature amount obtained from an inputted video image (e.g. partial image) and a feature amount obtained when the inputted video image is compression-encoded (e.g. AVC (Advanced Video Coding)/HEVC (High Efficiency Video Coding) encoder).

The feature amount obtained from an inputted video image may include at least one of the following (1) to (5). (1) An image texture type (for example, an edge region, a flat region, or a High Density/Detail/Crowd region). (2) A Harris corner feature point or an edge amount (for example, the coordinates of a feature point or an edge, and an edge intensity). (3) An optical flow (for example, the direction to which a rectangular region is moving and the moving speed of the rectangular region). (4) Depth data (for example, depth information regarding each pixel). (5) An object detection result obtained by image recognition (for example, information regarding a coordinate region including a chair or a vehicle).

The feature amount obtained when the inputted video image is compression-encoded may include at least one of the following (1) to (6). (1) Motion Estimation (ME) information (for example, the direction to which a rectangular region is moving and the moving speed of the rectangular region). (2) CU allocation information (the CU size, for example). (3) Information regarding a ROI (Resion of Interest) region. The ROI region is also called an attention region or a region of interest, and is an image region to which a high bitrate for enhancement of the image quality is allocated, for example. (4) Information regarding a used QP. (5) Whether or not scene switching is performed. and (6) Whether or not the frame is a key frame (I frame, for example).

FIG. 11 depicts an example of CU allocation information. The CU allocation information in FIG. 11 indicates that a smaller encoding unit block is allocated to a region with larger color variation. For example, the scene analyzing section A 30 may detect a region with large color variation on the basis of the CU allocation information while the scene-information acquiring section 32 may generate first scene information indicating the region with large color variation. The super-resolution processing section 48 of the client terminal 14 may execute a super-resolution process on the basis of the region, in a partial image, with large color variation indicated by the first scene information regarding the partial image.

Figure 12:
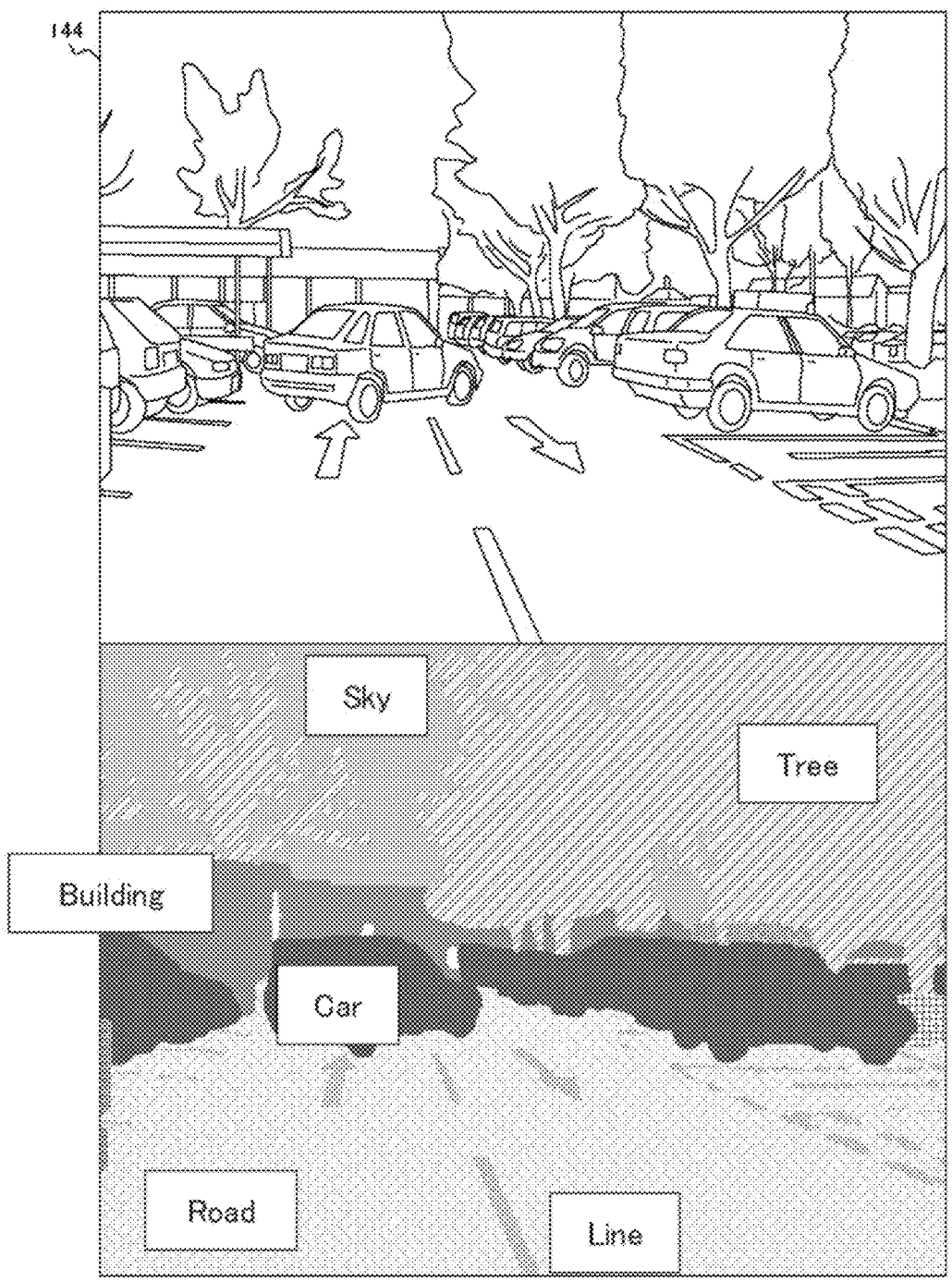
FIG. 12 is a diagram depicting an example of a scene analysis method.

FIG. 12 depicts an example of a scene analysis method. FIG. 12 indicates extracting the type of an object included in an image by scene segmentation. For example, at least one of the scene analyzing section A 30 in the server 12, the scene analyzing section B 26 in the server 12, and the scene analyzing section C 50 in the client terminal 14 may classify an image 144 in FIG. 12 as a sky, a tree, a car, a building, a road, or a lane region, for example, by a publicly known method such as template matching.

FIG. 13 also depicts an example of a scene analysis method. At least one of the scene analyzing section A 30 in the server 12, the scene analyzing section B 26 in the server 12, and the scene analyzing section C 50 in the client terminal 14 may extract a feature amount in an image by performing a publicly known human skin region inference process. A hatched region in FIG. 13 indicates a region regarded as human skin by inference. In the human skin region inference process, a score may be calculated for each of a plurality of regions included in an inputted image. A score calculation rule that is used in the human skin region inference process may be provided to allocate a higher score to a region regarded as a human skin by inference, rather than a region not regarded as a human skin by inference.

FIG. 14 also depicts an example of a scene analysis method. FIG. 14 depicts an example of detecting video compression noise. At least one of the scene analyzing section A 30 in the server 12, the scene analyzing section B 26 in the server 12, and the scene analyzing section C 50 in the client terminal 14 may detect video compression noise from an image, and may extract the video compression noise as a feature amount in the image. The source of FIG. 14 is "Local estimation of video compression artifacts" 2011 IEEE International Conference on Consumer Electronics (ICCE).

The super-resolution image generating section 104 may refer to an artifact strength illustrated in FIG. 14. The artifact strength can be regarded as the strength of a compressed artifact, and is data indicating the degree of image degradation (e.g. image distortion) caused by application of lossy compression. During a super-resolution process, the super-resolution image generating section 104 may increase the intensity of a smoothing filter in a region where intense image degradation has occurred due to noise, on the basis of a result of machine learning. For example, the super-resolution image generating section 104 may perform a smoothing process of a first intensity on a region where an artifact strength is less than a predetermined threshold, and may perform a smoothing process of a second intensity that is greater than the first intensity, on a region where an artifact strength is less than the predetermined threshold. Further, the super-resolution image generating section 104 may perform a more intensive smoothing process on a region having a greater artifact strength.

Examples of the scene information which is a decision material in a super-resolution process will be explained. At least one of the scene analyzing section A 30 and the scene analyzing section B 26 in the server 12 and the encoding-method acquiring section 46 and the scene analyzing section C 50 in the client terminal 14 may acquire at least one of (1) scene information indicating whether or not a user interaction is regarded as important, (2) scene information indicating scene contents or an image type, and (3) scene information indicating the current drawing method. The super-resolution processing section 48 of the client terminal 14 may execute a super-resolution process by using at least one of these pieces of (1) to (3) scene information.

The (1) scene information may include at least one of the following pieces of information.

(1-1) Information indicating that the drawn contents are a movie scene (pre-rendering) that does not require any user operation input, or indicating a state of waiting for loading or setup.

(1-2) Information indicating that the drawn contents are a game play scene that requires a user operation input (real-time rendering).

(1-3) Information indicating the frequency of sampling a user input when the drawn contents are a game play scene that requires a user operation input.

(1-4) Information indicating the game type (e.g. the category) when the drawn content is a game play scene that requires a user operation input. For example, a driving game, a shooting game, a battle action game, a strategy game, or a simulation game.

The (2) scene information may include at least one of the following pieces of information.

(2-1) Information indicating a GUI scene (e.g. a menu scene), a game scene, or any other video stream application.

(2-2) Information indicating a natural image taken by a camera, a CG (Computer Graphics) image, or an animation image.

The (3) scene information can be regarded as scene information regarding original setting for a drawing time and setting for compression-encoding and transfer.

The (3) scene information may include at least one of the following pieces of information.

(3-1) A drawing resolution, a frame rate, and a drawing bit color depth.

(3-2) Information regarding a rendering method. For example, whether ray tracing is used, an image region or object arrangement to which a ray tracing method is applied, whether or not a fog process is used and a region where the fog process is used, whether or not vamp mapping is used and a region where the vamp mapping is used, whether or not a reflection process is used and a region where the reflection process is used, and whether or not a Motion Blur effect (a process for blurring an object) is used and a region whether the Motion Blur effect is used.

(3-3) The details of a texture filtering process in rendering or a texture compression method.

(3-4) A compression method in a case where lossy frame buffer compression is used.

(3-5) A drawing anti-aliasing method. For example, a filter configuration, the number of filter taps, a filter coefficient, and whether or not a process specific to a contour or a fine pattern in an image is performed.

(3-6) A resolution conversion method in a case where resolution conversion is performed. For example, a filter configuration, the number of filter taps, a filter coefficient, and whether or not a process specific to a contour or a fine pattern in an image is performed.

(3-7) A drawing dynamic range, an HDR (High-Dynamic-range Rendering) profile, or a tone mapping method. For example, a mapping method or a calculation method involving rounding when a result of floating point arithmetic is taken down into a frame buffer output in GPU drawing, or information regarding a dynamic range originally held in a drawing process and information regarding a dynamic range in an output of a frame buffer.

(3-8) Information regarding a dithering method for drawing.

(3-9) Information regarding a used compression encoding method. For example, a macro block allocation method, a slice allocation method, a coefficient, a de-noise filter type coefficient, information indicating whether inter-compression (inter-frame compression) is used, information regarding a compression standard (e.g. AVC, HEVC, VP9, AV1 (AOMedia Video 1), DSC (Display Stream Compression)), information indicating whether compression is lossless or lossy, a bit depth, a QP, a rate control method, a target bitrate, or information indicating an IDR (Instantaneous Decoder Refresh) method or a GDR (Gradual Decoder Refresh) method.

As partially explained above, the super-resolution processing section 48 may select simplification or non-execution of a super-resolution process on the basis of scene information which has been acquired from the game application and acquired as a result of a process prior to a super-resolution process in the server 12 or the client terminal 14. The super-resolution processing section 48 may determine which of enhancement of the image quality by a super-resolution process or low delay is regarded as important, on the basis of the scene information.

Second Embodiment

The following explanation of a second embodiment will mainly focus on the difference from the first embodiment. An explanation of the common configuration will be omitted as appropriate. Constituent elements of the second embodiment identical or corresponding to those of the first embodiment will be denoted by the same reference signs. It goes without saying that a configuration of the second embodiment can freely be combined with a configuration of the first embodiment or a configuration of a modification thereof.

The second embodiment is different from the first embodiment in that an information processing apparatus (game console in the second embodiment) for controlling image display further generates an image. The game console of the second embodiment corresponds to the client terminal 14 of the first embodiment, but is different in the client terminal 14 of the first embodiment in that the game console singly generates an image, executes a super-resolution process for the image, and performs display control of a super-resolution image. It is to be noted that the technical concepts of the second and later embodiments are not limited to game consoles, and are applicable to various types of information processing apparatuses for processing images.

Figure 15:
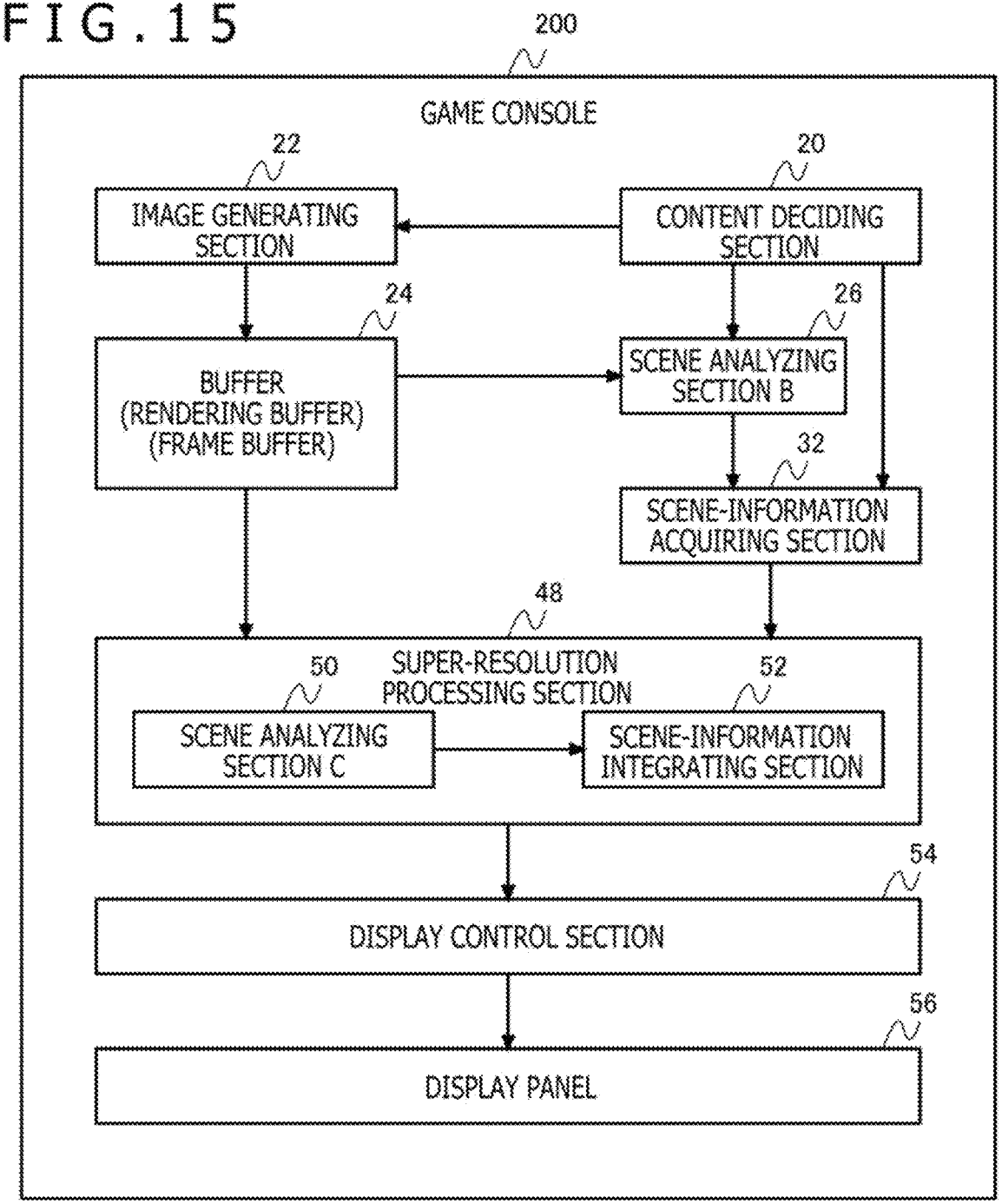
FIG. 15 is a block diagram depicting a configuration of a game console according to a second embodiment.

FIG. 15 is a block diagram depicting a configuration of a game console 200 according to the second embodiment. The game console 200 includes the content deciding section 20, the image generating section 22, the buffer 24, the scene analyzing section B 26, the scene-information acquiring section 32, the super-resolution processing section 48, the display control section 54, and the display panel 56. The super-resolution processing section 48 includes the scene analyzing section C 50 and the scene-information integrating section 52. The game console 200 does not have the functions related to compression encoding and expansion decoding, among the functions of the server 12 and the client terminal 14 of the first embodiment. The details of the functional blocks in FIG. 15 have been explained above, and thus, a repeated explanation thereof will be omitted.

Figure 16:
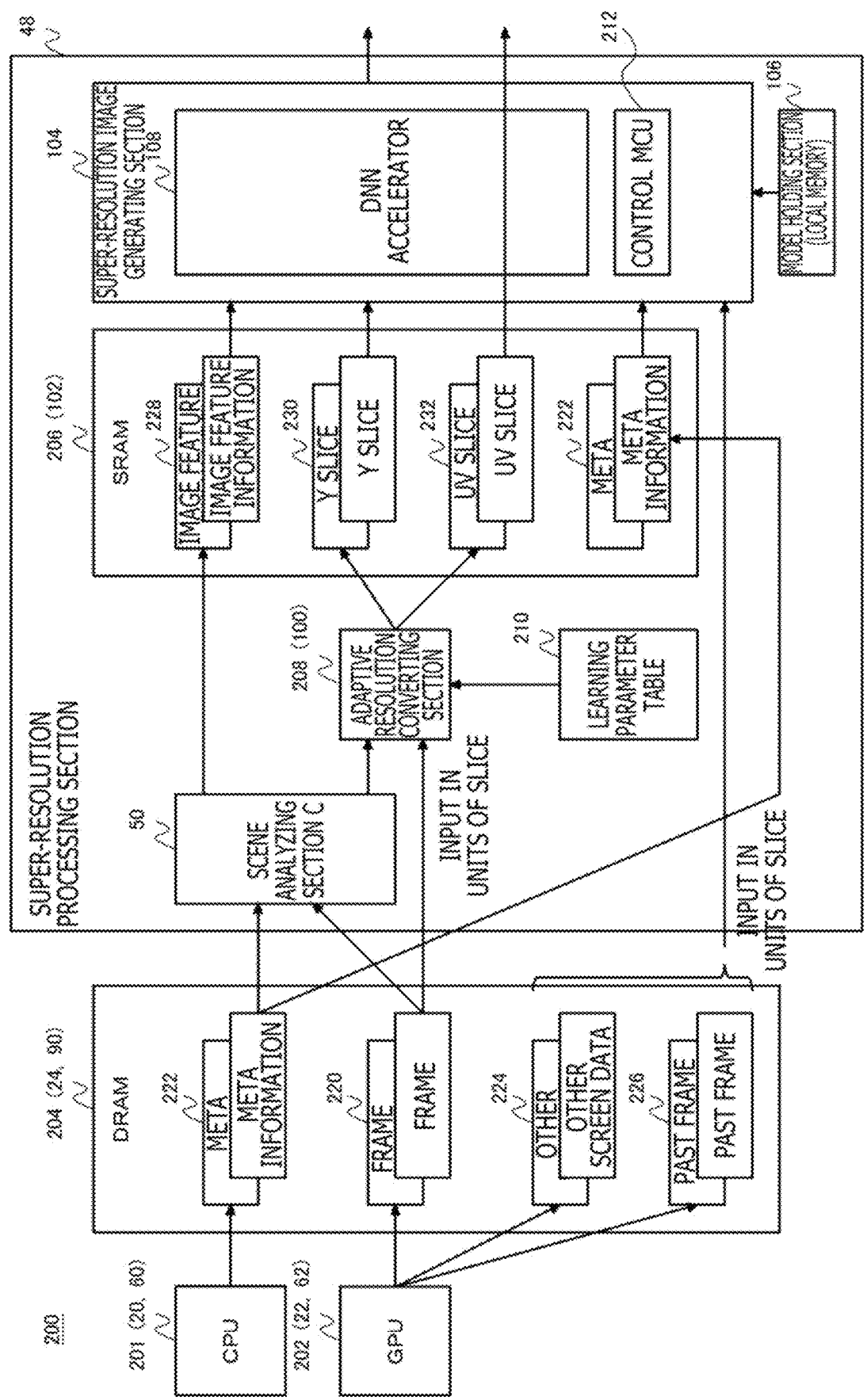
FIG. 16 is a block diagram depicting a configuration of the game console according to the second embodiment.
Figure 17:
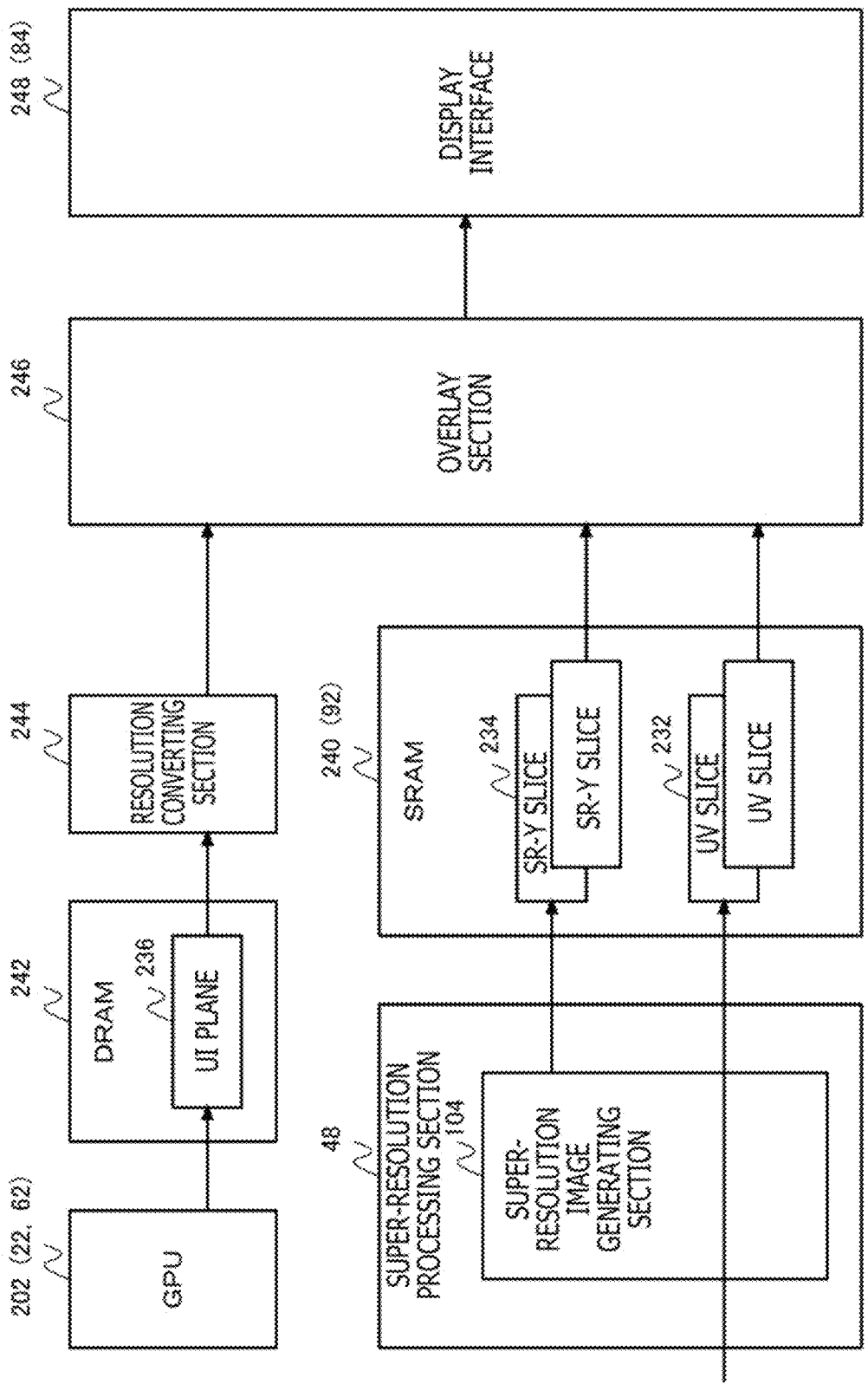
FIG. 17 is a block diagram depicting a configuration of the game console according to the second embodiment.

FIGS. 16 and 17 are block diagrams each depicting a configuration of the game console 200 of the second embodiment. FIG. 16 depicts functional blocks related to a prior-stage process. FIG. 17 depicts functional blocks related to a process following FIG. 16.

As depicted in FIG. 16, the game console 200 of the second embodiment includes a CPU 201, a GPU 202, a DRAM (Dynamic Random Access Memory) 204, and the super-resolution processing section 48. The super-resolution processing section 48 includes the scene analyzing section C 50, a SRAM (Static Random Access Memory) 206, an adaptive resolution converting section 208, a learning parameter table 210, the super-resolution image generating section 104, and the model holding section 106. In the block diagrams of the present specification, DRAMs and SRAMs are logically arranged. There is no limitation imposed on the physical number of DRAMs and SRAMs. For example, pluralities of DRAMs and SRAMs depicted in each block diagram may be implemented by one DRAM and one SRAM, respectively.

The DRAM 204 stores various types of data regarding images of a game application. The DRAM 204 corresponds to the buffer 24 and the partial-image storing section 90 of the first embodiment. Specifically, the DRAM 204 stores a frame 220, meta information 222, other screen data 224, and a past frame 226. The frame 220 is image data generated by a game application being executed and is, in other words, video data regarding game content. The GPU 202 corresponds to the image generating section 22 and the image drawing section 62 of the first embodiment. The GPU 202 generates the frame 220, and stores the frame 220 into the DRAM 204.

The meta information 222 includes scene information (e.g. information indicating drawn contents in the frame 220) which is a result of an analysis obtained by the scene analyzing section B 26 of the first embodiment, and further includes scene information (e.g. the arrangement state of a 3D object, a use texture characteristic, scene segmentation information) obtained by the content deciding section 20 of the first embodiment. The meta information 222 may be generated by either one of or both the CPU 201 (the content deciding section 20) and the GPU 202. In a case where there is no server, the meta information 222 may include the first scene information obtained by the scene analyzing section B 26 or the CPU 201 (the content deciding section 20) of the game console 200.

The other screen data 224 is image data other than an image of a game application in the game console 200. The other screen data 224 may include (a) first scene information obtained from the scene analyzing section B 26 of the game console 200, (b) internal drawing data in FIG. 9 or first scene information generated by the image generating section 22 of the game console 200, (c) a UI plane 236 which will be explained later, and the like. The other screen data 224 is the general name of (a) to (c).

The past frame 226 is data regarding a past image displayed in the game application that is currently being executed. The past frame 226 may be a pre-super-resolution processed frame 220, of the intermittently generated frames 220, generated in the past, or may be a frame in which data outputted from a display interface 248 after a super-resolution process is written back to a DRAM via an undepicted data path.

The meta information 222, the other screen data 224, and the past frame 226 in the DRAM 204 are inputted to the super-resolution processing section 48 in units of slice. The other screen data 224 and the past frame 226 may be inputted to the scene analyzing section C 50 or the adaptive resolution converting section 208, which are not depicted in the drawing. As additional data, image feature information 228, a Y slice 230, a UV slice 232, and the meta information 222 may be generated by the SRAM 206 on the basis of the other screen data 224 and the past frame 226 inputted to the scene analyzing section C 50 or the adaptive resolution converting section 208. The additional data generated by the SRAM 206 may be additionally inputted to the super-resolution image generating section 104, if needed.

The scene analyzing section C 50 is an optional functional block, and performs a scene analysis process as a process prior to a super-resolution process by referring to the meta information 222 in the DRAM 204 and by using a publicly known technology. The scene analyzing section C 50 may perform a scene analysis process similar to that performed by the scene analyzing section B 26 of the first embodiment. The scene analyzing section C 50 passes a result of the scene analysis (scene information) to the adaptive resolution converting section 208, and further, stores the result of the scene analysis (scene information) as the image feature information 228 into the SRAM 206. It is to be noted that the scene information according to the second embodiment may include contents similar to that in the scene information according to the first embodiment although contents related to compression encoding and expansion decoding have been excluded from the scene information according to the second embodiment.

The SRAM 206 corresponds to the partial-image storing section 102 of the first embodiment. The SRAM 206 stores the image feature information 228, and further stores the Y slice 230, the UV slice 232, and the meta information 222. The meta information 222 is transferred from the DRAM 204. The third scene information obtained from the scene analyzing section C 50 may be added to the meta information 222. The Y slice 230 and the UV slice 232 are data regarding a slice (of a YUV format in the embodiment) that is a partial image of the frame 220. The Y slice 230 is data regarding a Y component of the slice. The UV slice 232 is data regarding a UV component of the slice. The Y component can be regarded as a luminance component or a luminance signal. The UV component can be regarded as a color difference component, and includes a difference (U) between the illuminance signal and the blue component and a difference (V) between the illuminance signal and the red component. The UV component can also be regarded as a hue component and a color-saturation component.

The learning parameter table 210 holds a parameter that is referred to for classifying contents of a slice under a plurality of categories and that is created by machine learning.

The adaptive resolution converting section 208 corresponds to the resolution converting section 100 of the first embodiment, and reads out, in units of slice, data regarding the frame 220 stored in the DRAM 204, and performs adaptive resolution conversion on the read slice. The adaptive resolution conversion involves a process of increasing the resolution of the slice, as in the resolution converting section 100 of the first embodiment.

Further, the adaptive resolution conversion involves a process of classifying a sub-block (a primitive region of 4×4 pixels or 8×8 pixels, for example) of the slice read from the DRAM 204, under a plurality of categories on the basis of the scene information inputted from the scene analyzing section C 50 and a parameter stored in the learning parameter table 210. The plurality of categories may include several tens or several hundreds of categories. For example, the plurality of categories may include an edge region (e.g. a region in which variation of pixel values is large), a detailed region (e.g. a region in which pixel values finely vary), and a flat region (e.g. a region in which variation of pixel values is small).

According to the category of a sub-block of a slice, the adaptive resolution converting section 208 may apply, to the sub-block of the slice, a filter related to at least one of anti-alias, sharpness, noise rejection, and contrast enhancement. For example, a filter for weakening sharpness may be applied to a sub-block classified as an edge region. Further, a filter for enhancing sharpness may be applied to a sub-block classified as a detailed region. In addition, a filter for minimizing sharpness may be applied to a sub-block classified as a flat region.

The adaptive resolution converting section 208 stores the Y component of the slice having undergone the adaptive resolution conversion into the SRAM 206 (Y slice 230). In addition, the adaptive resolution converting section 208 stores the UV component of the slice having undergone the adaptive resolution conversion into the SRAM 206 (UV slice 232). In the second embodiment, the GPU 202 generates the frame 220 of a YUV format. In a modification, the GPU 202 may generate the frame 220 of an RGB format. In this case, the adaptive resolution converting section 208 may convert the frame 220 from the RGB format to a YUV format and thereafter may read out slice data from the converted frame.

The model holding section 106 stores a model for a super-resolution process on a Y component of a slice. Typically, the model holding section 106 stores a DNN model for scene classification and image conversion/reconfiguration. In a modification, the model holding section 106 may store a combination of a DNN model and another algorithm (e.g. a human based scene analysis algorithm or a super-resolution algorithm).

The super-resolution image generating section 104 reads out the Y slice 230 from the SRAM 206. The super-resolution image generating section 104 executes a super-resolution process (for example, enhancement of the image quality) on the Y slice 230 on the basis of the image feature information 228 and the meta information 222 stored in the SRAM 206 and the model stored in the model holding section 106. The super-resolution image generating section 104 includes the DNN accelerator 108 and a control MCU (Micro Control Unit) 212. The control MCU 212 corresponds to the super-resolution process control section 110 of the first embodiment. The control MCU 212 may perform a stripe-shaped image pipeline process, small-granularity DMA (Direct Memory Access) of a super-resolution algorithm, and an algorithm change process.

In addition, when executing a super-resolution process on the Y slice 230, the super-resolution image generating section 104 may refer to the other screen data 224 and the past frame 226 stored in the DRAM 204. For example, by referring to the other screen data 224 and the past frame 226, the super-resolution image generating section 104 may detect motion of an object drawn in the Y slice 230 to be processed, or noise included in the Y slice 230 to be processed. The super-resolution image generating section 104 may switch an algorithm (e.g. a filter) for a super-resolution process on the basis of motion of an object drawn in the Y slice 230. In addition, during a super-resolution process, the super-resolution image generating section 104 may cancel noise included in the Y slice 230.

The super-resolution image generating section 104 may acquire, from any data (228, 230, 232, 224, or 226, for example) inputted to the super-resolution image generating section 104, information indicating the image type, the shape, and the image coordinate position of a menu UI, a caption, or the like which is drawn by a game application or an OS. On the basis of the acquired information described above, the super-resolution image generating section 104 may switch a super-resolution process for the Y slice 230. For example, the super-resolution image generating section 104 may select, as a super-resolution process for the image region of a menu UI or caption, a super-resolution process that is unlikely to break an edge, on the basis of a DNN model learning result.

The super-resolution image generating section 104 stores a result (an SR-Y slice 234 which will be explained later) of the super-resolution process for the Y slice 230, into an SRAM 240 which will be explained later. On the other hand, the super-resolution image generating section 104 skips a super-resolution process for the UV slice 232 stored in the SRAM 206. The UV slice 232 stored in the SRAM 206 is transferred to the SRAM 240 which will be explained later, without undergoing a super-resolution process.

As depicted in FIG. 17, the game console 200 according to the second embodiment further includes the SRAM 240, a DRAM 242, a resolution converting section 244, an overlay section 246, and the display interface 248.

The SRAM 240 corresponds to the partial-image storing section 92 of the first embodiment. The SRAM 240 stores the SR-Y slice 234 generated by the super-resolution processing section 48 and the UV slice 232 which is not a target of a super-resolution process.

The GPU 202 further generates the UI plane 236 which is not an image of the game contents and is an image of a UI related to a user operation. The GPU 202 stores the generated UI plane 236 into the DRAM 242. The UI plane 236 is a kind of the other screen data 224, as previously explained, and includes an image representing various game menus generated by the game application and an image for various settings on the game. In addition, the UI plane 236 includes a UI image generated by the OS of the game console 200, separately from an application of a game or the like. The UI generated by the OS includes an image for switching or ending an application, an image notifying completion of downloading, and an image indicating friend information, for example.

The resolution converting section 244 may perform a resolution converting process for the UI plane 236 such that the resolution of the UI plane 236 becomes equal to that of an image that is a process result obtained by the adaptive resolution converting section 208. The overlay section 246 overlays (in other words, combines) the SR-Y slice 234 and the UV slice 232 stored in the SRAM 240, and the UI plane 236 having undergone resolution conversion at the resolution converting section 244. That is, the overlay section 246 generates one slice image (that is, a partial image) including both a game content image and an UI image.

A common ID (identification) (the common frame ID and the common slice ID, for example) is given to the Y slice 230 and the UV slice 232 extracted from the same frame 220 (slice) and the SR-Y slice 234 having undergone a super-resolution process. A period of time of the super-resolution process for the Y slice 230 that corresponds to the UV slice 232 is added to a period of time of holding the UV slice 232 in the SRAM 240. The corresponding Y slice 230 refers to a Y slice 230 originated from the same slice, in other words, a Y slice 230 with the common ID. The overlay section 246 combines the SR-Y slice 234 and the UV slice 232 with the common ID given thereto.

That is, the buffering amounts of the image feature information 228, the Y slice 230, and the meta information 222 in the SRAM 206 are set so as not to interrupt input data necessary for the super-resolution image generating section 104 (in other words, so as not to cause underflow). In addition, the buffering amount of the SR-Y slice 234 in the SRAM 240 is set so as not to interrupt input data necessary for the overlay section 246 (in other words, so as not to cause underflow).

On the other hand, the buffering amount of the UV slice 232 is set such that the data is held until the YUV components of the SR-Y slice 234 and the UV slice 232 that are originated from the same slice are combined by the overlay section 246 after a super-resolution process for the Y slice 230 originated from the same slice. In other words, the buffering amount of the UV slice 232 is set such that the following expression is established.

A holding time of the Y slice 230 in the SRAM 206+a processing time of the Y slice in the super-resolution image generating section 104+a holding time of the SR-Y slice 234 in the SRAM 240=a holding time of the UV slice 232 in the SRAM 240

In such buffering, the common ID is given to the Y slice 230 and the UV slice 232 that are originated from the same slice, and synchronization is thereby obtained.

The display interface 248 corresponds to the display controller 84 of the first embodiment. The display interface 248 sequentially displays, on the display panel 56 (display 86), a plurality of slice images sequentially generated by the overlay section 246.

With the game console 200 of the second embodiment, a super-resolution process is executed in units of slice, and slices having undergone the super-resolution process are sequentially displayed, as in the client terminal 14 of the first embodiment, whereby delay in the super-resolution process can be suppressed. In addition, the game console 200 executes a super-resolution process on for a Y component of a slice but does not execute a super-resolution process for a UV component of the slice. Accordingly, a calculation amount and a period of time required to execute a super-resolution process can be reduced, and further, a hardware resource amount in the game console 200 can be reduced.

In addition, the game console 200 synthesizes the UI plane 236 after a super-resolution process for a content frame, without executing a super-resolution process for the UI plane 236. Accordingly, a side effect (e.g. occurrence of a jaggy) caused by a super-resolution process for the UI plane 236 can be avoided. It is to be noted that the configuration of the second embodiment of executing a super-resolution process for a Y component of a slice only, or a configuration of refraining from executing a super-resolution process for the UI plane 236 can also be applied to the client terminal 14 of the first embodiment.

Third Embodiment

The following explanation of a third embodiment will mainly focus on the difference from the second embodiment. An explanation of the common configuration will be omitted as appropriate. Constituent elements of the third embodiment identical or corresponding to those of the above-described embodiments will be denoted by the same reference signs. It goes without saying that a configuration of the third embodiment can freely be combined with a configuration of any one of the other embodiments or a configuration of a modification thereof.

Figure 18:
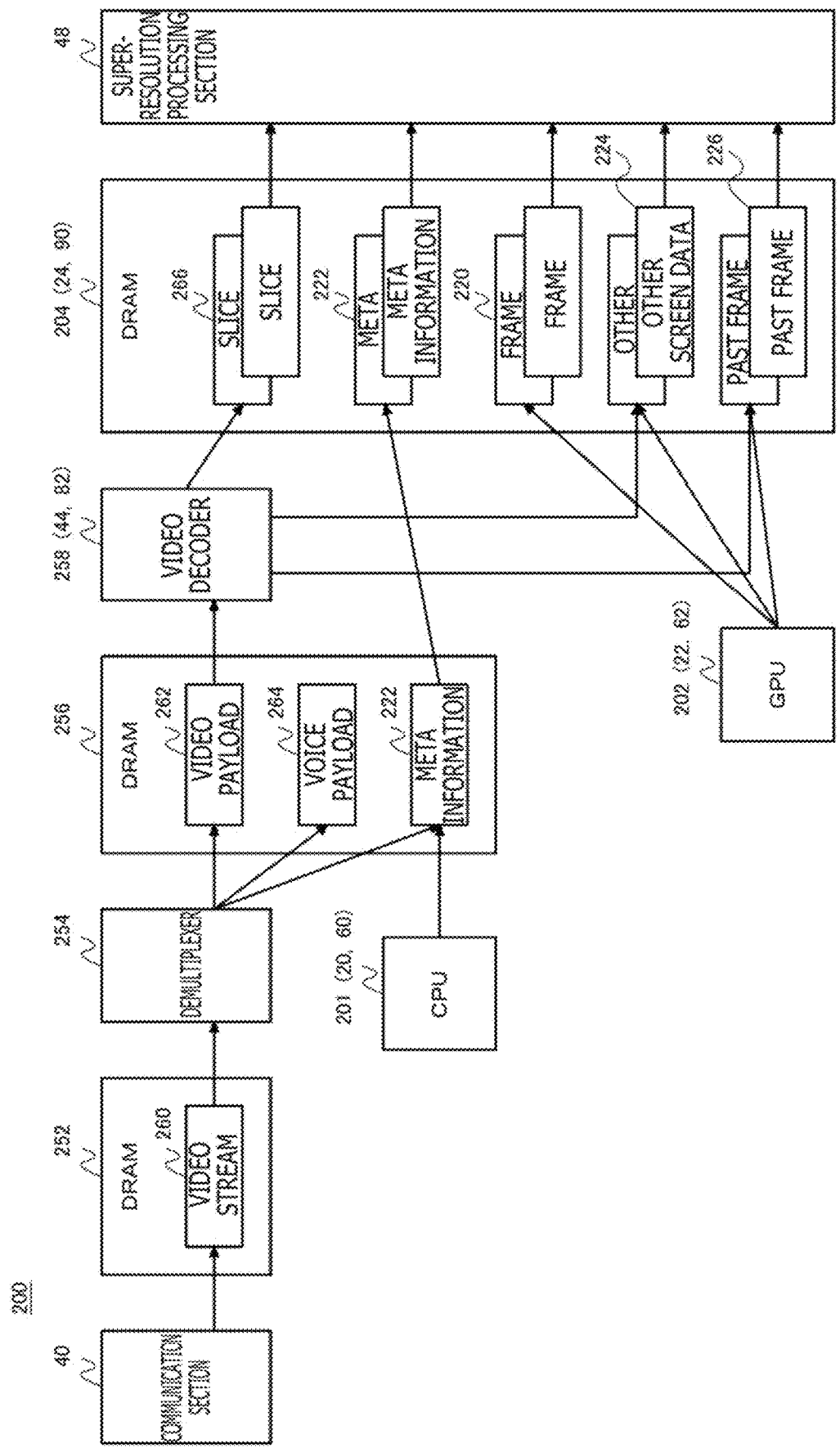
FIG. 18 is a block diagram depicting a configuration of a game console according to a third embodiment.

FIG. 18 is a block diagram depicting a configuration of a game console according to a third embodiment. The game console 200 according to the third embodiment includes the communication section 40, a DRAM 252, a demultiplexer 254, a DRAM 256, and a video decoder 258, in addition to the functional blocks depicted in FIG. 16 and FIG. 17 and included in the game console 200 according to the second embodiment. In the third embodiment, drawing in a game application does not need to be completed by a server alone, and the game console 200 may perform additional drawing. In addition, in the third embodiment, an OS or an application different from the game application may perform additional drawing.

The communication section 40 receives a video stream 260 streaming-transmitted from the server 12, and stores the received video stream 260 into the DRAM 252. The video stream 260 includes data regarding a slice to be subjected to a super-resolution process. The video stream 260 includes a video payload 262, a voice payload 264, and a slice 266, which will be explained later. The communication section 40 may have a communication function of Wi-Fi (registered trademark) (Wireless Fidelity), Gigabit Ethernet ("Ethernet" is a registered trademark), DMA, or the like. The communication section 40 may acquire the video stream 260 via publicly known wireless communication or wired communication. Alternatively, the communication section 40 may acquire the video stream stored in a predetermined memory via DMA.

The demultiplexer 254 extracts the video payload 262, the voice payload 264, and the meta information 222 from the video stream 260 stored in the DRAM 252, and stores the extracted video payload 262, the extracted voice payload 264, and the extracted meta information 222 into the DRAM 256.

The DRAM 256 stores the video payload 262, the voice payload 264, and the meta information 222. The meta information 222 can be regarded as hint information for a super-resolution process. The meta information 222 may include scene information that is provided from the server 12 to the client terminal 14 in the first embodiment, and may include scene information related to compression encoding of the slice, for example. In addition, the meta information 222 may include the first scene information and the second scene information generated by the server.

The video decoder 258 corresponds to the expansion decoding section 44 and the video decoder 82 of the first embodiment. The video decoder 258 expansion-decodes the video payload 262 stored in the DRAM 256, and stores the expansion-decoded data (slice 266) into the DRAM 204. The DRAM 204 stores the frame 220, the meta information 222, the other screen data 224, and the past frame 226, as in the second embodiment. In the third embodiment, the DRAM 204 further stores the slice 266. The other screen data 224 and the past frame 226 to be stored in the DRAM 204 are generated by both the GPU 202 and the video decoder 258.

The super-resolution processing section 48 reads the slice 266 (that is, a slice provided from the server 12) stored in the DRAM 204, and executes a super-resolution process for a Y component of the read slice. The super-resolution processing section 48 may read, in units of slice, data regarding the frame 220 stored in the DRAM 204, and may further execute a super-resolution process for a Y component of each read slice, as in the second embodiment. The later processes in the game console 200 according to the third embodiment are the same as those in the game console 200 according to the second embodiment, and thus, an explanation thereof will be omitted.

The game console 200 according to the third embodiment provides an effect similar to that of the game console 200 according to the second embodiment. Further, with the game console 200 according to the third embodiment, even in a case where a frame to be displayed is generated by both the server 12 and the game console 200, delay in the super-resolution process can be suppressed.

Fourth Embodiment

The following explanation of a fourth embodiment will mainly focus on the difference from the second embodiment. An explanation of the common configuration will be omitted as appropriate. Constituent elements of the fourth embodiment identical or corresponding to those of the above-described embodiments will be denoted by the same reference signs. It goes without saying that a configuration of the fourth embodiment can freely be combined with a configuration of any one of the other embodiments or a configuration of a modification thereof.

In a game console according to the fourth embodiment, scene information (that is, hint information for a super-resolution process) is directly inputted to a super-resolution processing section (the super-resolution image generating section 104 which will be explained later). The game console according to the fourth embodiment is not equipped with a scene analysis circuit. The game console according to the fourth embodiment preliminarily performs machine learning of a super-resolution process form that is suitable for a pair of scene information and an inputted image, instead. With the game console according to the fourth embodiment, the hardware cost is reduced by a scene analysis circuit being omitted, and a super-resolution process that is equivalent to that in a case where a scene analysis circuit is provided can be executed. That is, the game console according to the fourth embodiment can achieve further reduction of the hardware cost while providing effects similar to those provided by the game consoles according to the above-described embodiments.

In addition, unlike the game console 200 in FIG. 17, the game console according to the fourth embodiment can avoid a side effect (e.g. occurrence of a jaggy) caused by a super-resolution process for an OS-UI without using a buffering system or a data path from which a UI plane is separated. In addition, a super-resolution process can be further executed for an OS-UI plane which will be explained later. Moreover, a scene analysis is omitted, and thus, delay in the super-resolution processes can be suppressed.

Figure 19:
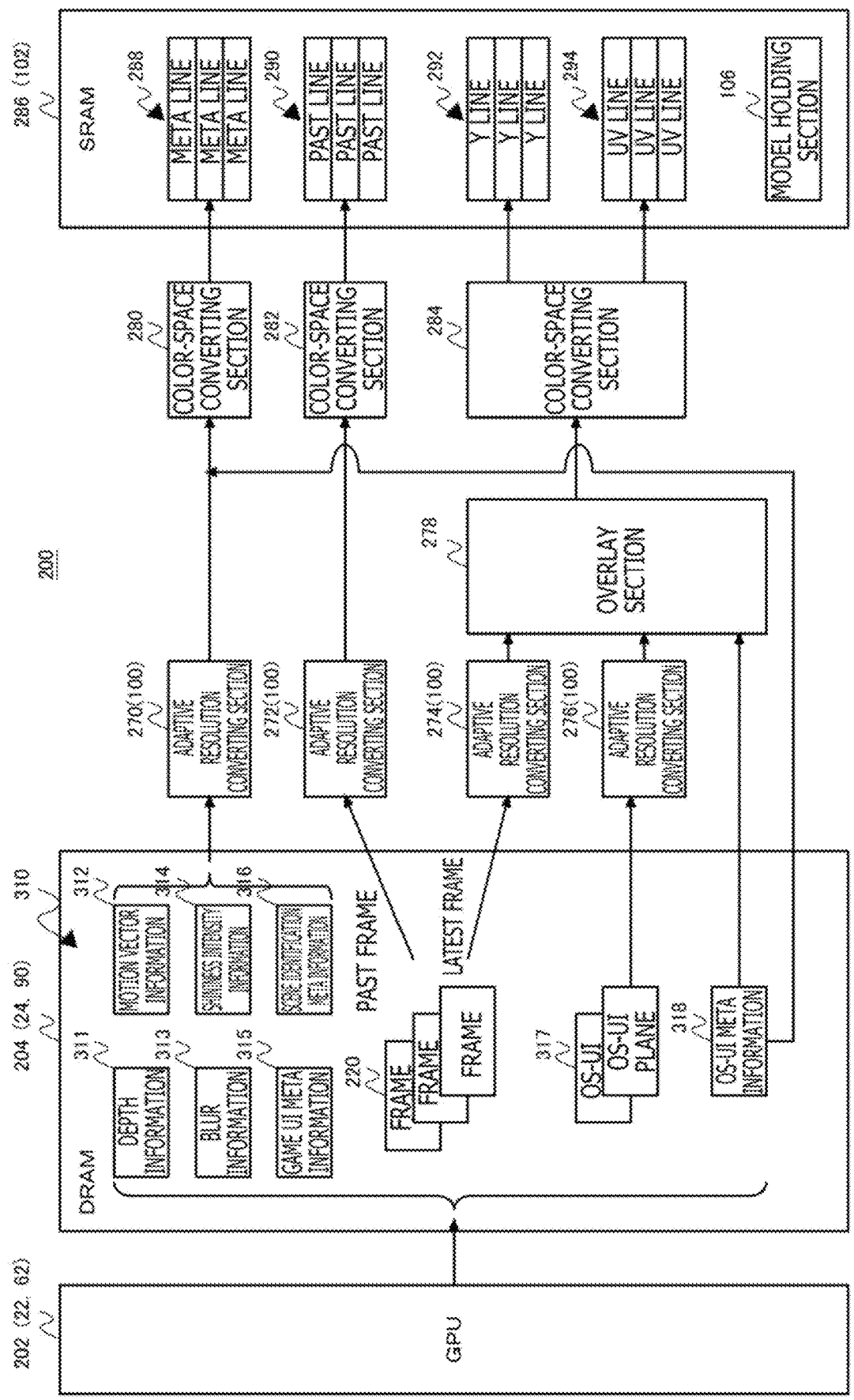
FIG. 19 is a block diagram depicting a configuration of a game console according to a fourth embodiment.
Figure 21:
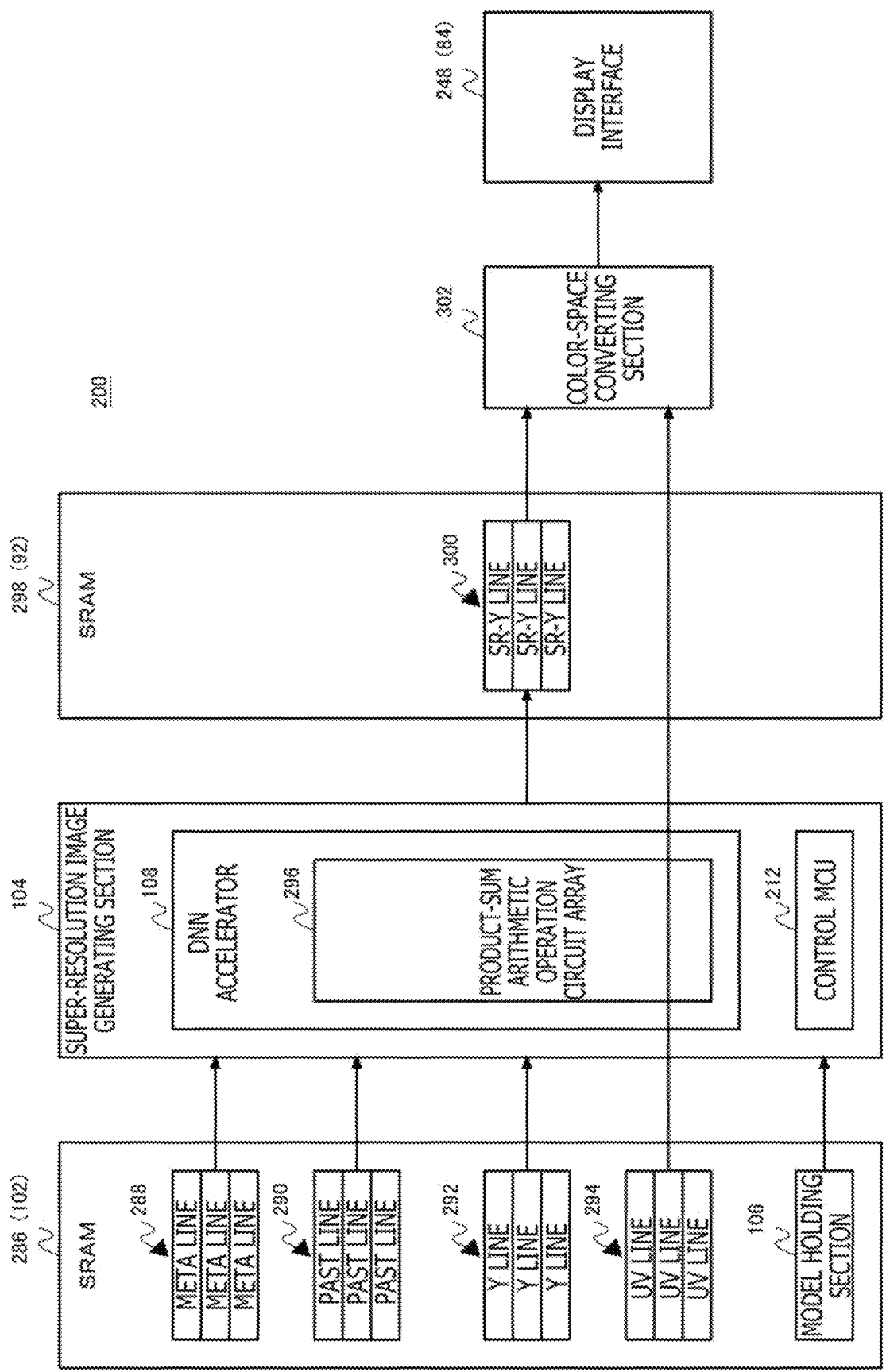
FIG. 21 is a block diagram depicting a configuration of the game console according to the fourth embodiment.

FIGS. 19 and 21 are block diagrams each depicting a configuration of the game console 200 of the fourth embodiment. FIG. 19 depicts functional blocks that are related to a prior stage process. FIG. 21 depicts functional blocks that are related to a process following FIG. 19.

As depicted in FIG. 19, the game console 200 according to the fourth embodiment includes the GPU 202, the DRAM 204, an adaptive resolution converting section 270, an adaptive resolution converting section 272, an adaptive resolution converting section 274, an adaptive resolution converting section 276, an overlay section 278, a color-space converting section 280, a color-space converting section 282, a color-space converting section 284, and a SRAM 286. The adaptive resolution converting section 270 and the color-space converting section 280 are optional functional blocks.

The GPU 202 generates the frame 220, frame meta information 310, an OS-UI plane 317, and OS-UI meta information 318, and stores the generated data into the DRAM 204. The frame meta information 310 is meta information regarding drawn contents in each frame 220. The frame meta information 310 includes depth information 311, motion vector information 312, blur information 313, shininess intensity information 314, game UI meta information 315, and scene identification meta information 316.

The depth information 311 may include depth information (the depth information in FIG. 9, for example) on respective pixels, or a Z value in a 3D game. The motion vector information 312 may include motion vector information (the motion vector information in FIG. 9, for example) on respective objects drawn in the frame 220. The blur information 313 indicates whether or not the above-mentioned Motion Blur effect is used and the use region of the effect. The blur information 313 may further include information indicating the degree of blur of drawn contents in the frame 220. The shininess intensity information 314 may include information (the shininess intensity information in FIG. 9, for example) indicating the shininess intensity of drawn contents in the frame 220.

The game UI meta information 315 is meta information regarding an image representing the various menus of a game generated by a game application and an image for various game settings (hereinafter, also referred to as a "game UI") of the UI planes of the second embodiment. In the fourth embodiment, a game UI is drawn in the frame 220. The game UI meta information 315 includes the position of the game UI in a screen or the frame 220 and the a value (transparency) of the game UI. The scene identification meta information 316 includes identification information regarding a scene drawn in the frame 220. The scene identification meta information 316 may include the "scene information which is a decision material in a super-resolution process," which has been explained in the first embodiment, for example.

The OS-UI plane 317 is an image of an UI (hereinafter, also referred to as an "OS-UI") generated by the OS of the game console 200 separately from an application of a game or the like, of the UI planes of the second embodiment. The OS-UI meta information 318 is meta information regarding the OS-UI. The OS-UI meta information 318 includes the position of the OS-UI in a screen or the frame 220 and the a value (transparency) of the OS-UI.

The adaptive resolution converting section 270 performs adaptive resolution conversion on the frame meta information 310 stored in the DRAM 204. The adaptive resolution converting section 272 performs adaptive resolution conversion on a past frame among the frames 220 stored in the DRAM 204. The past frame refers to a frame, among the frames 220 that are intermittently generated, having not undergone a super-resolution process after generated in the past, or refers to a frame obtained by writing data outputted from the display interface 248 back to the DRAM 204 via a data path (not depicted) after a super-resolution process, for example. The adaptive resolution converting section 274 performs adaptive resolution conversion on the latest frame (in other words, a frame to be subjected to the next super-resolution process) of the frames 220 stored in the DRAM 204. The adaptive resolution converting section 276 performs adaptive resolution conversion on the OS-UI plane 317 stored in the DRAM 204.

The adaptive resolution conversion has been explained in the second embodiment, and thus, a repeated explanation thereof will be omitted. It is to be noted that the adaptive resolution converting section 270, the adaptive resolution converting section 272, the adaptive resolution converting section 274, and the adaptive resolution converting section 276 may each perform the adaptive resolution conversion by referring to the corresponding learned parameter for the conversion, as the adaptive resolution converting section 208 of the second embodiment.

The overlay section 278 overlays the frame 220 having undergone the adaptive resolution conversion and the OS-UI plane 317 on the basis of the OS-UI meta information 318. The overlay section 278 may combine the frame 220 and the OS-UI plane 317 in such a manner that, at a position in the frame 220 indicated by the OS-UI meta information 318, the OS-UI plane 317 is disposed with the transparency indicated by the OS-UI meta information 318. Hereinafter, an image obtained by the overlaying process by the overlay section 278 is referred to as a "synthesized frame."

The frame meta information 310 having undergone the adaptive resolution conversion, the past frame, and the synthesized frame are not necessarily data having a color space optimized for a super-resolution process. For example, the past frame and the synthesized frame may be in an RGB format and the respective components thereof may have an 8-bit length, or the past frame and the synthesized frame may be in an RGB format and the respective components thereof may have a 32-bit floating-point number length. In addition, the past frame and the synthesized frame may be data (YUV444) adopting a method of collecting one sample of luminance information, one sample of the difference between the luminance and a blue component, and one sample of the difference between the luminance and a red component from each of consecutive four pixels in a YUV format in the horizontal direction. The color-space converting section 280, the color-space converting section 282, and the color-space converting section 284 convert the frame meta information 310 having undergone the adaptive resolution conversion, the past frame, and the synthesized frame, into data having a color space optimized for a super-resolution process.

The color-space converting section 280 converts a data format of the frame meta information 310 to a data format optimal for the super-resolution image generating section 104, if needed. In a case where a data format of the frame meta information 310 used for preliminary machine learning of a super-resolution process form suitable for a pair of scene information, that is, the frame meta information 310 and an inputted image is different from a data format of the frame meta information 310 in the DRAM 204, the color-space converting section 280 performs conversion for data format matching. The color-space converting section 280 extracts, in units of line, data regarding the frame meta information 310 having undergone the data conversion, if needed, and stores the line data (referred to as "meta line data 288") into the SRAM 286. The color-space converting section 282 converts a past frame to YUV format data having a Y component of a 12-bit length, if needed. The color-space converting section 282 extracts, in units of line, data regarding the past frame (Y component only) having undergone the color space conversion, and stores the line data (referred to as "past line data 290") into the SRAM 286.

The color-space converting section 284 converts a synthesized frame to YUV-format data having a Y component of a 12-bit length, if needed. The color-space converting section 284 extracts, in units of line, data (Y component only) on the synthesized frame having undergone the color space conversion, and stores the line data (referred to as "Y line data 292") into the SRAM 286. In addition, the color-space converting section 284 extracts, in units of line, data (U component and V component) on the synthesized frame having undergone the color space conversion, and stores the line data (referred to as "UV line data 294") into the SRAM 286.

The SRAM 286 corresponds to the partial-image storing section 102 of the first embodiment. The SRAM 286 includes a ring buffer that stores a plurality of sets of the meta line data 288, a ring buffer that stores a plurality of sets of the past line data 290, a ring buffer that stores a plurality of sets of the Y line data 292, a ring buffer that stores a plurality of sets of the UV line data 294, and the model holding section 106.

Figure 20:
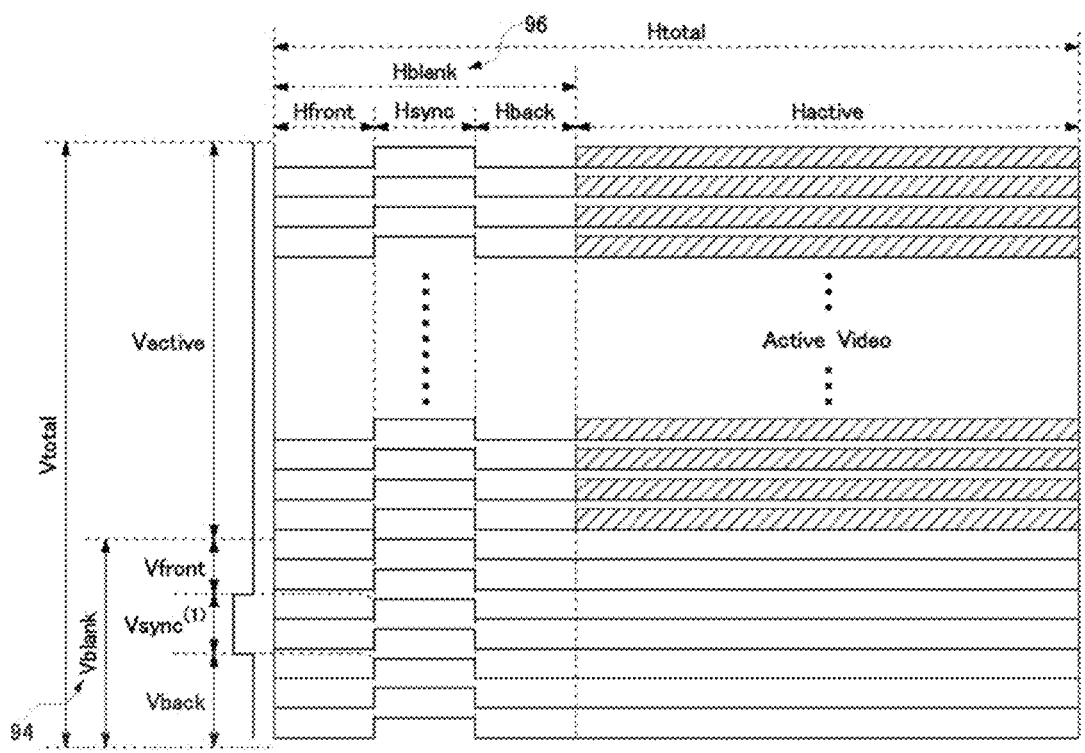
FIG. 20 is a diagram depicting a video timing example.

FIG. 20 depicts a video timing example. FIG. 20 is given to explain line data stored in the SRAM 286. The line data stored in the SRAM 286 corresponds to one line of an Active Video during an active display period (Vactive and Hactive period) in FIG. 20.

As depicted in FIG. 21, the game console 200 according to the fourth embodiment further includes the super-resolution image generating section 104, a SRAM 298, a color-space converting section 302, and the display interface 248.

The super-resolution image generating section 104 executes a super-resolution process based on deep learning of the Y line data 292 according to a deep learning-based model stored in the model holding section 106, the meta line data 288, and the past line data 290. For example, the super-resolution image generating section 104 may detect motion of an object included in the Y line data 292 by comparing the past line data 290 and the Y line data 292, and may select a filter that is suitable for the motion.

In addition, on the basis of the positions and transparencies of a game UI and an OS-UI indicated by the meta line data 288, the super-resolution image generating section 104 may select, for a region of the game UI and the OS-UI in the Y line data 292, a filter different from a filter for a game content region, or may select a dedicated filter for the UI region. In addition, on the basis of the positions and transparencies of the game UI and the OS-UI indicated by the meta line data 288, the super-resolution image generating section 104 may select a special filter or a dedicated filter so as to avoid occurrence of a jaggy in the game UI and the OS-UI in the Y line data 292. Accordingly, a side effect (e.g. occurrence of a jaggy) caused by a super-resolution process executed for the game UI and the OS-UI can be avoided.

The DNN accelerator 108 of the super-resolution image generating section 104 includes a product-sum arithmetic operation circuit array 296. The product-sum arithmetic operation circuit array 296 repeats 3×3 or 5×5 convolution calculation during a super-resolution process based on deep learning. In a case where 3×3 convolution calculation is performed, the process is started when line data regarding at least three lines are inputted to each ring buffer of the SRAM 286. Then, each time line data regarding new one line is inputted to each ring buffer of the SRAM 286, convolution calculation of the next line can be performed.

A Y slice processing time of the super-resolution image generating section 104 is calculated with a configuration of convolution calculation of a model for use and a configuration of a computer of a DNN accelerator. Information regarding the configuration of the model includes a Kernel size (3×3 or 5×5, for example) of convolution calculation, stride and dilatation (1, 2, for example) which indicate the density of the convolution calculation, the number of input/output channels (1 input, 16 outputs, for example) in each convolution layer, the number of convolution layers, the configuration of the convolution layers (Full convolution, depthwise convolution, for example), a configuration of an activation layer (ReLU (Rectified Linear Unit), for example), and an input/output resolution (input of 1920×1080 pixels, output of 3840×2160 pixels, for example). The configuration of a computer of a DNN accelerator includes a sum-product operation number and an activation operation number which can be simultaneously processed, for example. On the precondition that convolution calculation of the next line can be performed each time line data regarding new one line is inputted to each ring buffer, the processing time is calculated on the basis of the information regarding the configuration of the model and the configuration of the computer of the DNN accelerator.

The super-resolution image generating section 104 stores SR-Y line data 300 which is a result of the super-resolution process for the Y line data 292, into the SRAM 298. On the other hand, the super-resolution image generating section 104 skips a super-resolution process for the UV line data 294 stored in the SRAM 286. The UV line data 294 stored in the SRAM 286 is passed to the color-space converting section 302 which will be explained below, without being subjected to a super-resolution process.

The color-space converting section 302 combines the SR-Y line data 300 stored in the SRAM 298 with the UV line data 294 corresponding to the SR-Y line data 300, and generates line data (YUV format) corresponding to one line in an image to be displayed. After generating the line data of a YUV format, the color-space converting section 302 optimizes the color space in the line data for a display. Each time a new set of the SR-Y line data 300 is stored into the SRAM 298, the color-space converting section 302 adds the new line data and performs color space conversion, and sequentially passes a plurality of sets of line data to the display interface 248.

The display interface 248 corresponds to the display controller 84 of the first embodiment. The display interface 248 sequentially displays, on the display panel 56 (display 86), a plurality of sets of the line data sequentially outputted from the color-space converting section 302.

By referring to the blur information during a super-resolution process, the super-resolution image generating section 104 may refrain from increasing the definition, through the super-resolution process, of a blurred image region, that is, a region where an image is intentionally blurred, on the basis of a machine learning result. Accordingly, a situation in which the super-resolution process leads to enhancement of the definition of an intended blur can be avoided. In addition, it is difficult for human beings to, when viewing an image, recognize the details of drawn contents in a region including an object that is largely moving, but human beings are sensitive to a change in an edge region or the like. For this reason, by referring to the motion vector information regarding objects in an image during a super-resolution process, the super-resolution image generating section 104 may refrain from executing a super-resolution process on a region including an object that is largely moving, on the basis of machine learning. In addition, the super-resolution image generating section 104 may refrain from executing a super-resolution process (conversion) on an edge portion of a region including an object that is largely moving, on the basis of machine learning. Accordingly, enhancement of the definition of a region for which a super-resolution process is unnecessary can be inhibited, and further, conversion of an edge region can be inhibited.

The present disclosure has been explained so far on the basis of the embodiments. These embodiments are illustrative. A person skilled in the art will understand that various modifications can be made to a combination of the constituent elements or a combination of the processes and that such modifications are also included in the scope of the present disclosure.

Unless otherwise noted, the term "threshold" in the embodiments and modifications may be set to a proper value on the basis of the knowledge of the developers of the information processing system 10 or the game console 200, or an experiment using the information processing system 10 or the game console 200.

Any combination of the above-described embodiments and modifications is also effective as an embodiment of the present disclosure. A new embodiment created by such a combination provides all the effects of the combined embodiment and modification. In addition, a person skilled in the art will understand that a function to be achieved by a constituent element set forth in the claims is implemented by one of the constituent elements described in the embodiments and modifications alone, or by cooperation of the constituent requirements.

INDUSTRIAL APPLICABILITY

The technology according to the present disclosure is applicable to an apparatus, a server, or a system for processing images.

REFERENCE SIGNS LIST

10: Information processing system
12: Server
14: Client terminal
22: Image generating section
28: Compression encoding section
32: Scene-information acquiring section
42: Data acquiring section
48: Super-resolution processing section
54: Display control section

The invention claimed is:

1. An image processing apparatus comprising:
one or more processors; and
one or more memories storing instruction that, when executed by the one or more processors, cause the image processing apparatus to perform operations comprising:
acquiring video data in units of partial image which is smaller than one frame;
executing a super-resolution process in the units of partial image, wherein executing the super-resolution process comprises acquiring first scene information prior to compression-encoding a unit of partial image of the units of partial image and acquiring second scene information after compression-encoding the unit of partial image, wherein the second scene information is generated based on a compression-encoded partial image, wherein executing the super-resolution process comprises switching a model for the super-resolution process based on the first scene information and the second scene information; and
sequentially outputting, to a display section, partial images that have undergone the super-resolution process.

2. The image processing apparatus according to claim 1, the operations further comprising:
expansion-decoding a compression-encoded partial image to form an expansion-decoded partial image, and
executing a super-resolution process on the expansion-decoded partial image.

3. The image processing apparatus according to claim 1, wherein executing the super-resolution process comprises performing a scene analysis on a basis of a partial image, and executing the super-resolution process for the partial image on a basis of a result of the scene analysis.

4. The image processing apparatus according to claim 3, wherein executing the super-resolution process comprises generating one or more partial images, each partial image of the one or more partial images having a resolution which is lower than a resolution of a partial image, and performing a scene analysis of the one or more partial images in order from a partial image with a relatively low resolution to a partial image with a relatively high resolution.

5. The image processing apparatus according to claim 3, wherein executing the super-resolution process comprises extracting, from discrete positions in the partial image, a plurality of region images of an analysis unit granularity that is smaller than a partial image, and performing the scene analysis based on the plurality of region images.

6. The image processing apparatus according to claim 3, wherein executing the super-resolution process comprises performing the scene analysis by referring to internal drawing data held in an application, before the application generates a final drawing result, and uses a result of the scene analysis for the super-resolution process.

7. The image processing apparatus according to claim 1, wherein executing the super-resolution process comprises referring to internal drawing data held in an application, before the application generates a final drawing result, and uses the internal drawing data for the super-resolution process.

8. The image processing apparatus according to claim 1, wherein executing the super-resolution process comprises selecting simplification or nonexecution of the super-resolution process on a basis of scene information that indicates a feature in a partial image acquired as a result of a process prior to executing the super-resolution process.

9. The image processing apparatus according to claim 1, wherein the second scene information is acquired before the compression-encoded partial image is expansion-decoded.

10. The image processing apparatus according to claim 1, wherein executing the super-resolution process comprises acquiring scene information by using internal drawing data held in an application, before the application generates a final drawing result, and switching a model for the super-resolution process on a basis of the scene information.

11. The image processing apparatus according to claim 1, wherein executing the super-resolution process comprises dividing a partial image into Y-component data and UV-component data, and does not execute a super-resolution process for the UV-component data but executes a super-resolution process for the Y-component data.

12. The image processing apparatus according to claim 11, wherein
a common identification is given to the Y-component data and the UV-component data that are originated from a same partial image, and
the UV-component data is buffered during the super-resolution process for the Y-component data, and is combined with the Y-component data with the common identification, the Y-component data having been undergone the super-resolution process.

* * * * *